(12) United States Patent
Dresser et al.

(10) Patent No.: US 12,165,535 B2
(45) Date of Patent: Dec. 10, 2024

(54) SYSTEM AND METHOD OF FACILITATING LIVE JAM SESSION WITH SONG RECOMMENDATION ENGINE TO RECOMMEND A SONG TO BE PLAYED

(71) Applicant: School of Rock, LLC, Canton, MA (US)

(72) Inventors: Sam Dresser, Glen Ellyn, IL (US); Leonard A. Sitnick, Catonsville, MD (US); Robert Lowell Price, Sharon, MA (US)

(73) Assignee: School of Rock, LLC, Canton, OH (US)

( * ) Notice: Subject to any disclaimer, the term of this patent is extended or adjusted under 35 U.S.C. 154(b) by 204 days.

(21) Appl. No.: 17/844,142

(22) Filed: Jun. 20, 2022

(65) Prior Publication Data
US 2022/0319350 A1    Oct. 6, 2022

Related U.S. Application Data

(63) Continuation-in-part of application No. 17/553,423, filed on Dec. 16, 2021, which is a (Continued)

(30) Foreign Application Priority Data

Jun. 18, 2021 (TW) .................. 110122397

(51) Int. Cl.
  *G09B 15/00* (2006.01)
  *G06F 16/635* (2019.01)
(52) U.S. Cl.
  CPC .......... *G09B 15/00* (2013.01); *G06F 16/635* (2019.01)

(58) Field of Classification Search
  CPC .............................. G09B 15/00; G06F 16/635
  See application file for complete search history.

(56) References Cited

U.S. PATENT DOCUMENTS

| 5,585,583 A | 12/1996 | Owen | |
|---|---|---|---|
| 6,369,313 B2 * | 4/2002 | Devecka | G10H 1/361 |
| | | | 84/743 |

(Continued)

FOREIGN PATENT DOCUMENTS

WO    2020257535 A1    12/2020

OTHER PUBLICATIONS

European Patent Office; International Search Report and Written Opinion of International Searching Authority for Application No. PCT/US2022/034185, mailed Nov. 22, 2022 (21 pages).

(Continued)

*Primary Examiner* — Robert W Horn
(74) *Attorney, Agent, or Firm* — Ice Miller LLP; Justin D. Swindells

(57) ABSTRACT

A computer-aided method of educating a plurality of music students in an ensemble, including: (i) receiving search parameters from a client device for searching a multidimensional database of songs, the multidimensional database of songs being compiled to include dimensions of at least (a) instrument parts which indicate a music component being played by a particular type of instrument, (b) educational concepts present, (c) one or more proficiency levels for each of the instrument parts; (ii) searching the multidimensional database of songs to retrieve one or more songs that match the received search parameters, the one or more songs being songs that match proficiency levels of the plurality of music students in the ensemble; (iii) receiving an indication from the client device of a selected song in the one or more songs;

(Continued)

and (iv) providing to the client device method books associated with educational concepts of the selected song.

20 Claims, 20 Drawing Sheets

Related U.S. Application Data continuation-in-part of application No. PCT/US2020/038556, filed on Jun. 18, 2020, which is a continuation of application No. 16/443,961, filed on Jun. 18, 2019, now Pat. No. 10,891,872.

(56) References Cited

U.S. PATENT DOCUMENTS

| | | | |
|---|---|---|---|
| 6,639,138 B1 | 10/2003 | Hester | |
| 6,678,680 B1 | 1/2004 | Woo | |
| 7,838,755 B2 | 11/2010 | Taub | |
| 7,890,374 B1 | 2/2011 | Khan | |
| 9,661,043 B2 * | 5/2017 | Walker | H04L 67/1097 |
| 10,891,872 B1 * | 1/2021 | Dresser | G09B 15/00 |
| 2002/0002899 A1 | 1/2002 | Gjerdingen | |
| 2002/0052933 A1 | 5/2002 | Leonhard | |
| 2004/0074376 A1 | 4/2004 | Varme | |
| 2006/0134590 A1 | 6/2006 | Huffman | |
| 2007/0131094 A1 | 6/2007 | Kemp | |
| 2008/0190271 A1 * | 8/2008 | Taub | G10H 1/0058 84/645 |
| 2008/0190272 A1 | 8/2008 | Taub | |
| 2008/0302233 A1 * | 12/2008 | Ding | G09B 15/023 84/609 |
| 2009/0132077 A1 | 5/2009 | Fujihara | |
| 2012/0151344 A1 | 6/2012 | Humphrey et al. | |
| 2015/0186419 A1 | 7/2015 | Agrawal | |
| 2015/0254056 A1 | 9/2015 | Walker et al. | |
| 2017/0018202 A1 | 1/2017 | Marradi | |
| 2018/0341702 A1 | 11/2018 | Sawruk | |
| 2019/0012381 A1 | 1/2019 | Debique | |
| 2020/0186575 A1 | 6/2020 | Rofe et al. | |
| 2022/0319350 A1 * | 10/2022 | Dresser | G06F 16/9535 |

OTHER PUBLICATIONS

International Search Report and Written Opinion in International Application No. PCT/US2020/038556, mailed Sep. 16, 2020 (9 pages).

Office Action (w/translation) issued in Colombian Application No. NC2021/0004391, mailed Sep. 2, 2024 [21 Pages].

* cited by examiner django_session
- session_key:VARCHAR
- session_data:LONGTEXT
- expire_date:DATETIME django_migrations
- id_INT
- app:VARCHAR
- name:VARCHAR
- applied:DATETIME auth_group_permissions
- id_INT
- group_id:INT
- permission_id:INT portal_user_groups
- id_INT
- user_id:INT
- group_id:INT portal_user_user_permissions
- id_INT
- user_id:INT
- permission_id:INT django_admin_log
- id_INT
- action_time:DATETIME
- object_id:LONGTEXT
- object_repr:VARCHAR
- action_flag:SMALLINT
- change_message:LONGTEXT
- content_type_id:INT
- user_id:INT auth_group
- id_INT
- name:VARCHAR auth_permission
- id_INT
- name:VARCHAR
- content_type_id:INT
- codename:VARCHAR portal_user
- id_INT
- password:VARCHAR
- last_login:DATETIME
- is_superuser:TINYINT
- username:VARCHAR
- first_name:VARCHAR
- last_name:VARCHAR
- email:VARCHAR
- is_staff:TINYINT
- is_active:TINYINT
- date_joined:DATETIME django_content_type
- id_INT
- app_label_VARCHAR
- model:VARCHAR

501

| FIG. 5A |
| FIG. 5B |
| FIG. 5C |

*FIG. 5A*

Educational Concepts for Guitar Instrument

| Technique | Concept | Scale | Special tuning or effects |
|---|---|---|---|
| Hammer-On | Power Chords | Minor Pentatonic | Open G Tuning |
| Pull-Off | Open Chords | Major Pentatonic | Open D Tuning |
| Slides | Barre Chords | Hybrid Pentatonic | Drop D Tuning |
| Bends | 7 Chord - Dom | Major Scale | Eb Standard |
| Unison Bends | 7 Chord - Major | Natural Minor | DADGAD |
| Pre-Bends | 7 Chord - Minor | Blues Scale | Double Drop D |
| Vibrato | 9 Chord | Harmonic Minor | Drop Db |
| Palm Muting | Sus Chord | Mixing/Combining Scales | Other Alternate Tuning |
| Easy strumming pattern | Add Chord | Dorian | Acoustic |
| Advanced strumming pattern | Diminished Chord | Phrygian | 12-string |
| Broken Chords | Augmented Chord | Lydian | Capo |
| Downpicking | Extended Chord | Mixolydian | Wah |
| Tremolo Picking | 7b9 Chord | Locrian | Delay |
| Sweep Picking | 7#9 Chord | Diminished Scale | Chorus |
| String Skipping | Inversions | Exotic Scale | Flanger |
| Gallop | Major Arpeggio | Melodic Minor | Talk Box |
| Hybrid Picking | Minor Arpeggio | | Tremolo Effect |
| Fingerpicking | 7th Arpeggio | | Phaser |
| Slide Guitar | Octaves | | Other Effect |
| Tapping | Rock Licks | | |
| Whammy Bar | Guitar Shuffle | | |
| Legato | Blue 3rd | | |
| Staccato | Chord Fills | | |
| | Double Stops | | |
| | Guitar Harmonies | | |
| | Beginner Solo | | |
| | Intermediate Solo | | |
| | Advanced Solo | | |
| | Melodic Solo | | |

*FIG. 7A*

Educational Concepts for Bass Instrument

| Technique | Concept | Scale | Other |
|---|---|---|---|
| Mutes | Major Arpeggio | Minor Pentatonic | Drop D |
| Bass Tapping | Minor Arpeggio | Major Pentatonic | Eb Standard |
| Gallop | Diminished Arpeggio | Major Scale | Drop Db |
| Slapping | Augmented Arpeggio | Natural Minor | Bass FX |
| Double Thump | Bass Walking | Harmonic Minor | Bass Break |
| Bends | Swing | Mixing/Combining Scales | Bass Solo |
| String Skipping | Inversions | Dorian | Fretless |
| Slides | Basic Syncopation | Phrygian | 5-string bass |
| Hammer-On | Advanced Syncopation | Lydian | |
| Pull-Off | Chromatic Walks | Mixolydian | |
| Vibrato | Octaves | Locrian | |
| Using a Pick | Melodic Bass Line | Diminished Scale | |
| Legato | Bass Pedal Tone | Exotic Scale | |
| Staccato | 1/4 Note Bass Groove | | |
| | 1/8 Note Bass Groove | | |
| | 1/16 Note Bass Groove | | |
| | Triplets | | |
| | Dotted Notes | | |
| | 7th Chords | | |
| | Blue Third | | |
| | Bass Chords | | |

*FIG. 7B*

Educational Concepts for Drum Instrument

| Technique | Concept | Rudiment | Other |
|---|---|---|---|
| Ghost Notes | 1/4 Note Drum Groove | Single Stroke Roll | Tambourine |
| Brushes / Rods | 1/8 Note Drum Groove | Double Stroke Roll | Clave |
| Double Bass / Kick | 1/16 Note Drum Groove | Paradiddle | Shaker |
| Limb Independence - Beginner | Halftime / Doubletime | Five stroke Rolls | Cowbell |
| Limb Independence - Intermediate | Basic Syncopation | Seven stroke Rolls | Cabasa |
| Limb Independence - Advanced | Advanced Syncopation | Nine Stroke Rolls | Vibraslap |
| Bell Pattern | Syncopated Kick | Flams | Congas |
| | Syncopated Snare | Drags | Bongos |
| | Syncopated Toms | Four Stroke Ruff | Mallets |
| | Syncopated Fills | Six Stroke Roll | Other percussion |
| | Triplets | Buzz Roll | Drum Solo |
| | Dotted Notes | Paradiddle-diddle | Drum Break |
| | Quintuplets | | Percussion Break |
| | Septuplets | | |
| | Swing | | |
| | Latin Rhythms | | |
| | 32nd Notes | | |
| | Linear Drumming | | |
| | Blues Shuffle | | |
| | 2:3 Clave Groove | | |
| | 3:2 Clave Groove | | |
| | Tom Groove | | |
| | Halftime (Purdie) Shuffle | | |
| | Bo Diddley Beat | | |
| | Four on the Floor | | |
| | Upbeat/Offbeat Groove | | |
| | One Handed 16th Note Groove | | |
| | Two Handed 16th Note Groove | | |

*FIG. 7C*

Educational Concepts for Keys Instrument

| Technique | Concept | Scale | Other |
|---|---|---|---|
| Right Hand Only | Power Chords | Minor Pentatonic | Piano |
| Left Hand Only | Major Triads | Major Pentatonic | Organ |
| Hands Together | Minor Triads | Hybrid Pentatonic | Synth |
| L/R Independence - Beginner | Diminished Triads | Major Scale | Electric Piano |
| L/R Independence - Intermediate | Augmented Triads | Natural Minor | Strings |
| L/R Independence - Advanced | Traid Inversions | Blues Scale | Brass |
| Multiple Keyboards | Triad Arpeggios | Harmonic Minor | Clavinet |
| Sustain Pedal | 7th Chords | Mixing/Combining Scales | Vibe / Bell |
| Bending Notes | 7th Chord Inversions | Dorian | Marimba or other mallet |
| Expression Knob/Pedal | 7th Chord Arpeggios | Phrygian | Sine |
| Glissando | 9 Chord | Lydian | Square |
| Trill | Sus Chord | Mixolydian | Arpeggiator |
| Shake | Add Chord | Locrian | Polyphonic |
| Stride | Rootless Voicings | Diminished Scale | Pad |
| Legato | Open Voicing | Exotic Scale | Lead |
| Staccato | Close Voicing | Melodic Minor | FX |
| | Walking Bassline | | Electronic Drum / Percussion |
| | Ostinato Bassline | | Other Patch |
| | Melodic Bassline | | Portamento |
| | Funk Bassline | | Organ Solo |
| | Pedal Tone | | Synth Solo |
| | Extended Chords | | Piano/EP Solo |
| | Altered Dominant | | |
| | Swing | | |
| | Basic Syncopation | | |
| | Advanced Syncopation | | |
| | Passing Chords | | |
| | Triplets | | |
| | Octaves | | |

*FIG. 7D*

Educational Concepts for Vocal

| Technique | Concept | Scale | Other | Range |
|---|---|---|---|---|
| Head Voice | Vibrato | Major | Choral Vocals | Bass |
| Chest Voice | Staccato | Minor | Gang Vocals | Baritone |
| Blend | Legato | Modal | Call & Response | Tenor |
| Belt | Tenuto | Pentatonic Major | Notable Interval | Alto |
| Two-part harmony | Accent | Pentatonic Minor | Notable chord tone | Soprano |
| Three-part harmony | Triplets | Harmonic Minor | Non-lexical / scat | |
| Four-part harmony | Syncopation | Blues Scale | Explicit Content / Adult Themes | |
| Close Harmony | Triplets | Mixing / Combining Scales | a capella Intro | |
| Octave harmony | Crescendo | Exotic Scales | Vocal Break | |
| Parallel Harmony | Decrescendo | | Duet | |
| Counterpoint Harmony | Major Arpeggio | | | |
| | Minor Arpeggio | | | |
| | Ad libs / Improvisation | | | |
| | Slurs | | | |
| | Scoops / Bends / Slides | | | |
| | Drops | | | |
| | Riffs / Runs | | | |

*FIG. 7E*

SYSTEM AND METHOD OF FACILITATING LIVE JAM SESSION WITH SONG RECOMMENDATION ENGINE TO RECOMMEND A SONG TO BE PLAYED

BACKGROUND

Current music education, whether performance-based or lesson-based, rely on method books and song catalogs that instructors use to lead each individual student stepwise from one level of skills and proficiency to another. Students are often grouped with others at similar levels, playing the same instrument, in an effort to make the process more efficient. Ensembles may then be assembled of students who have individually achieved the ability to play a particular song, and those ensembles then taught to perform together. This particular group learning technique can be demotivating for less proficient students and frustrating for more advanced students. Due to the long stretches of work on individual, isolated capabilities, students frequently lose interest in the learning process, or begin to lose old skills while focusing exclusively on new ones.

Students or skilled musicians alike can mutually benefit from jamming or improvising as an ensemble, but assembling players having different proficiency levels, different technical abilities, and who play different musical instruments, for example, is challenging. Ad hoc jam sessions where complete strangers assemble to create an ensemble pose a particular challenge for song selection where strangers know nothing about each other except perhaps which instrument each plays. This challenge is further exacerbated for friends who wish to jam together but are physically located too far apart to play as a group in person find current solutions lacking. Some attempts have been made to play via popular videoconferencing platforms such as ZOOM, but these suffer from latency and synchronization problems. In a pedagogical or curriculum-based environment, synchronized timing is critical as a learning and teaching tool, so if the sounds produced by each instrument arrive at different times, not only will the overall effect be diminished, but the student and teacher will not know the cause of the loss of synchronization (i.e., whether it was due to the player playing out of synch or network delay). Professional musicians grow frustrated with latency and lack of synchronization because players cue off one another's timing, which if off, produces a confused and discombobulated effect overall. Song selection paralysis can also set in in which players cannot find a common song to play as an ensemble which is appropriate for each player's individual proficiency, technique skillset, theme preference, and/or musical instrument. Conversely, with a song or song ensemble selection, it is very challenging to find the right mix of players to jam together to play the song or song ensemble.

The way in which traditional web and video conferencing platforms are built is not conducive for real-time collaboration that requires as little latency as possible. However, with the introduction of some software and hardware components, and with the right prioritization and optimization of a virtual network of devices and nodes, latency can be reduced significantly, to the point where new forms of real-time collaboration can be enabled. Furthermore, expansions and extensions of this virtual network can introduce new ways to find, connect with, and collaborate with others.

SUMMARY

Embodiments of the present disclosure address the identified problems with current music education, as well as additional problems not mentioned here. Some embodiments of the present disclosure facilitate groups of students that are each working at different levels to work together as an ensemble. Such a group learns new skills and improves existing skills through performance preparation and performance. By so doing, interest in the lessons, practice, and skills are enhanced, and ultimately, skill retention is enhanced.

A computer-aided method of educating music students includes assembling an ensemble of at least three music students studying differing instruments at differing proficiency levels and focusing on differing musical techniques. The method further includes compiling a multidimensional database of songs, wherein dimensions of the database include three or more of instrumentation requirements, technique requirements, musical styles represented, proficiency levels, and show theme suitability; and searching the database for songs having instrumentations, techniques, styles, and proficiency levels matching those of the students, and also having suitability with a desired show theme. In a variation of the computer-aided method, searching further comprises: selecting songs by skills and techniques to be taught in individual lessons to individual students, wherein the selected songs can then be played by the ensemble of students using their differing instruments, differing proficiency levels, and differing musical techniques. In a further variation, searching further comprises: selecting songs that fit a common show theme. In an alternate further variation, searching further comprises: selecting additional songs by a combination of student preferences, skills, and techniques to be taught, that can then be played by the ensemble of students using their differing instruments, differing proficiency levels, and differing musical techniques. In another alternate further variation, searching further comprises: selecting additional songs by a combination of instructor preferences for demonstration purposes, and student skills and techniques to be taught, that can then be played by the ensemble of students using their differing instruments, differing proficiency levels, and differing musical techniques.

An improved music education system comprises: a server holding a multidimensional database of songs, wherein dimensions of the database include three or more of: instrumentation requirements, technique requirements, musical styles represented, proficiency levels, and show theme suitability; and a client for searching the database for songs having desired characteristics matching differing instruments, differing proficiency levels, and differing musical techniques of a group of students. In a variation, the music education system further comprises: selecting songs by skills and techniques to be taught in individual lessons to individual students, wherein the selected songs can then be played by the group of students using differing instruments, differing proficiency levels, and differing musical techniques. In a further variation, searching further comprises: selecting songs that fit a common show theme. In an alternate further variation, searching further comprises: selecting additional songs by a combination of student preferences, skills, and techniques to be taught, that can then be played by the group of students using differing instruments, differing proficiency levels, and differing musical techniques. In another further variation, searching further comprises: selecting additional songs by combination of instructor preferences for demonstration purposes, and student skills and techniques to be taught, that can then be played by the group of students using differing instruments, differing proficiency levels, and differing musical techniques.

Participants in a jam session can connect to a service with the necessary components (microphone, instrument capture, CPU). Then the user connects to an existing session that has been already created or hosted by another participant user. Additionally, the user can create a new session. The session can have both a moderator or moderators, who has the ability to mute or unmute participants, disconnect users, or perform additional functions. The session can also have a host, which may change dynamically to optimize performance and reduce latency. The host can alternately be a central server or third-party node.

Participants can search for a session based on criteria, and can be recommended sessions to join or create based on similar or additional criteria. For example, location can be considered to ensure the best performance and lowest latency. Other performance or compatibility attributes can be considered as well, such as internet speed, ping, or type of CPU. For some use cases, additional criteria can be considered, taking into account self-selected preferences, personal taste, what hardware components or elements are available, participant's level of proficiency, and more.

These sessions can be extended to incorporate additional user types. For example, some users can connect as spectators. These spectators would not need all of the hardware components required for other participants or hosts, but would also have limited interactivity options. They would likely not have an ultra low-latency two-way connection, but may be able to interact with the participants through chat, virtual hand raising, virtual applause, or even asking questions through audio and or video and a standard internet connection.

According to aspects of the present disclosure, a miniature network with nodes that dynamically expand or contract is disclosed. Each node is a very thin device optimized for audio transmission with low latency to ensure synchronization among audio channels from other devices on the mini-network. This mini-network is used by players to find and connect to jam sessions for real-time synchronous playing, such as in an ensemble or band in a professional, friendly, or pedagogical setting. Aspects of the disclosure relate to the ability to find other nodes to connect with and expand the mini-network based on criteria. Each potential node has a dedicated headless controller to participate. Spectators are also contemplated, but can use mobile phones, tablet computers, laptops, etc. to connect. There must be at least one audio channel amongst all the nodes, and utilization of the audio channel is prioritized over all other functions to ensure lowest possible latency.

Audio levels from each node in the mini-network can be adjusted centrally (e.g., at a central server) or individually (e.g., at each node or by a host node). Sound effects can be added or applied (reverb, distortion, etc.), and channels can be muted or isolated. Multiple channels are supported, e.g., voice/microphone as one channel and instrument as another channel. Each participant can be assessed by an automated assessment algorithm such as MATCHMYSOUND.

Mini-networks can be located and prioritized based on or one more of: location; number of existing participants/nodes; network speeds/connections/ping time/latency. One node is designated as self-hosting, and each mini-network allows for real-time, lowest latency connectivity and synchronization.

The system can be proactive and send out a push notification as a call for participants based on location or distance from one another, age, time zone, genre or style, preferred language, affinity, instrument, or other criteria. Different types of jams are also contemplated: jams open to participants, but closed to spectators; jams open to spectators, but closed to participants; jams open or closed to all (participants and spectators alike). Spectators can clap, chat, submit requests for songs, vote, tip, charge a fee, follow during a jam session. A concert mode allows participant channels to be prioritized while muting spectators.

According to an aspect of the present disclosure, there is disclosed a system to facilitate a live jam session featuring live audio of a song produced by human players and which is mixed in real time to produce a mixed audio output. The song is automatically recommended by a song recommendation engine. The system includes: a first controller having a low-latency audio performance under 50 ms, the first controller being associated with a first user; a first audio interface including a first audio input to receive sound from a microphone or from a musical instrument played by a first of the human players associated with the first user; a server communicatively coupled to the controller via a computer network. The server is configured to: retrieve a musical instrument played by the first player and a proficiency level of the first player; initiate a jam session in which the first controller is assigned to be a host of the jam session. The system further includes a second controller having a low-latency audio performance under 50 ms, the second controller being associated with a second user; and a second audio interface including a second audio input to receive sound from a microphone or from a musical instrument played by a second of the human players associated with the second user. The server is further configured to: retrieve a musical instrument played by the second player and a proficiency level of the second player; invite the second user or accept a request by the second user to join the live jam session; recommend to the first user and the second user a song to be played during the jam session based on at least the respective musical instruments played by the first and second players and the respective proficiency levels of the first and second players. During the jam session, the first audio input and the second audio input are mixed in real time to produce a mixed output, a representation of which is streamed via the computer network for playback on a computing device.

The first controller can operate as a headless system. An operating system running on the first controller is optimized for the low-latency audio performance. Multiple spectator user devices can passively playback the streamed representation of the mixed output of the live jam session. The server can be further configured to: mute or prohibit each of the plurality of spectator user devices from introducing any audio into the mixed output during performance of the live jam session; during a selected time during the live jam session or following performance of a song of the live jam session, activating a respective microphone of each of the plurality of spectator user devices such that the audio representation of sounds inputted to the respective microphones are mixed in real time with the mixed output.

The audio representation can be sound of humans operating the spectator user devices applauding or audibly cheering the performance.

In the following description reference is made to the accompanying drawings, which form a part hereof, and in which are shown example implementations. It should be understood that other implementations are possible, and that these example implementations are intended to be merely illustrative.

DESCRIPTION OF THE DRAWINGS

FIGS. 5A, 5B, and 5C taken together are a database schema diagram illustrating the various independent and dependent tables and relationships of the database of an embodiment of the present disclosure;

FIG. 7A illustrates a table of educational concepts for a guitar, according to some embodiments of the present disclosure;

FIG. 7B illustrates a table of educational concepts for a bass, according to some embodiments of the present disclosure;

FIG. 7C illustrates a table of educational concepts for a drum, according to some embodiments of the present disclosure;

FIG. 7D illustrates a table of educational concepts for a keys instrument, according to some embodiments of the present disclosure;

FIG. 7E illustrates a table of educational concepts for vocals, according to some embodiments of the present disclosure;

DETAILED DESCRIPTION

Music education has critical societal benefits, and is of wide-spread interest. There is well-documented evidence that musical ability correlates to other skills and abilities. But, conventional music education is both linear and rigid, rendering it less sticky than desired. That is, students may not pick up new skills and performance levels, or retain old skills and performance levels as well as desired. Results are consequently poor at conventional music schools and programs; students drop music classes at an alarming frequency. In contrast, teaching and learning music is best done through immersion, through dialog with other students, and through dialog between students and teachers, all in both individual and ensemble settings. Immersion and dialog for the purposes of music education most often take place on a non-verbal level, through the common language and experience of the music, itself. One reason that conventional music schools do not simply change the balance between individual instruction and ensemble instruction is that simply switching to an ensemble model of learning poses substantial challenges. In addition to the complexities inherent in an ensemble of different instruments, it is rare that an ensemble can be assembled in which all members are at a common proficiency level, with common technical breadth and depth.

Some embodiments of the present disclosure provide systems and methods practiced by a music studio having, or having access to, a database of music accessible using an app executing on a computer or device, or through a browser executing on a computer or device. The database includes plural layers of information relating songs and educational concepts, the selection of which is key. The layers may include such song-specific educational concepts as instrumentation requirements, techniques required, musical styles represented, and show theme suitability. Additional layers may include, but are not limited to, tempo, key, scales, time signatures, notable intervals, song form, and vocal range. Thus, an instructor can create a thematic performance for a group of musicians studying various instruments at different levels to build their skill sets and proficiency through experiential learning. Efficacy of the teaching and learning processes is improved by removing randomness from the educational journey. The journey is curated in a way to accommodate the variety of requirements of the group of students.

Figure 1:
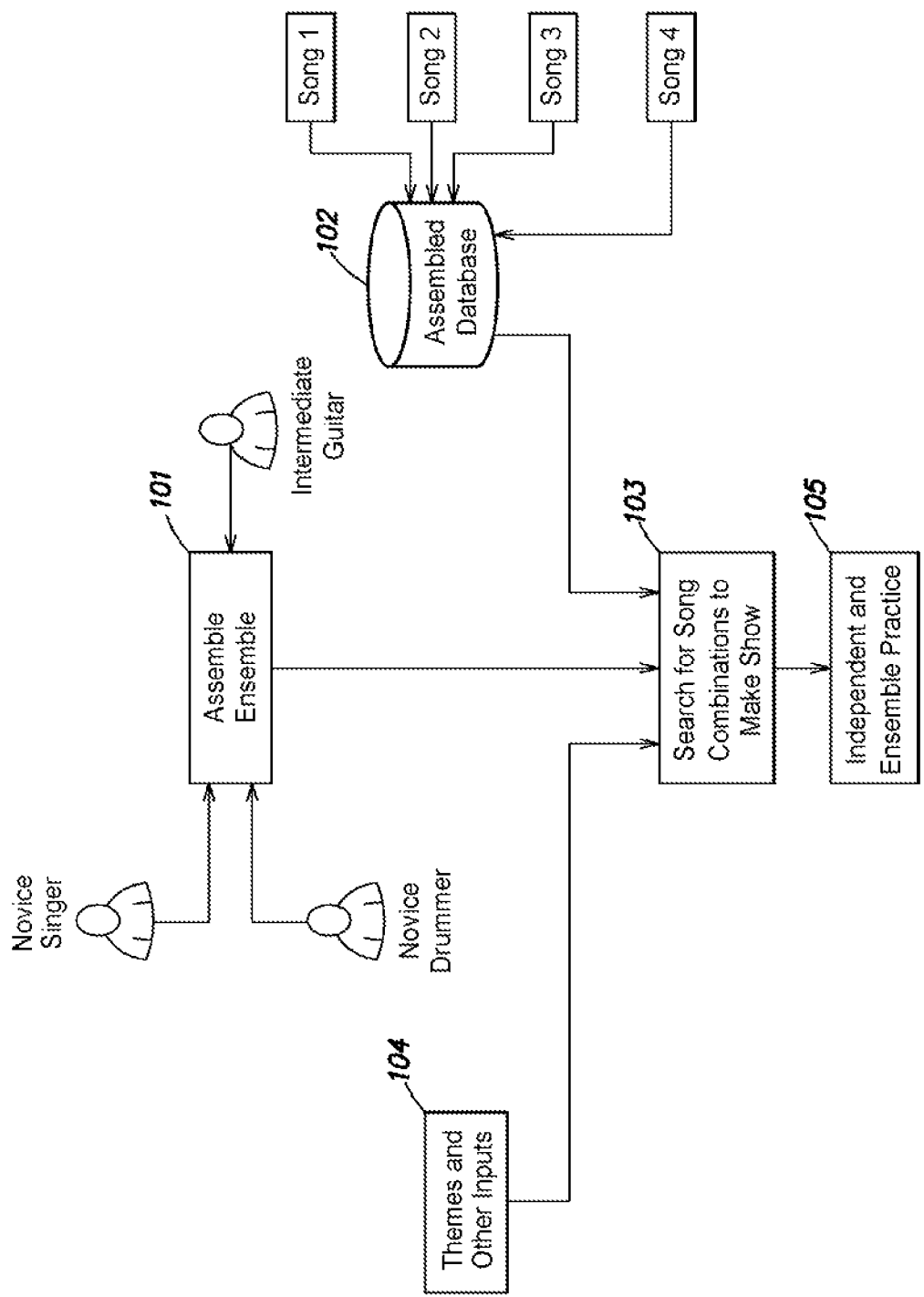
FIG. 1 is a process flow diagram showing a music education method according to some embodiments of the present disclosure.

As shown in FIG. 1, a method according to some embodiments of the present disclosure includes several activities, some of which must be performed with the assistance of computing systems, while others may be performed by a variety of means.

For example, an instructor, administrator, or other person may assemble an ensemble, 101, of students to learn, practice, and perform together. As used herein, a student may variously be referred to as a player or a participant or a musician. The term "student" is used in a pedagogical context, whereas the term player or participant or musician can be used in a pedagogical or non-pedagogical context. A "user" refers a user of a computer or computer system, which is operated by a human person. A computer user is typically associated with a user account in which the human person uses credentials to access the account as a computer user. An instructor can be referred to as a player, participant, or musician herein. A user can refer to any computer user as that term is understood by those skilled in the art of computers and computer programming. The choice of members in the ensemble may be somewhat arbitrary, depending on the desired result, or the members can be selected based on common availability, for example, or other considerations or attributes as disclosed herein. A suitable mix of instruments (e.g., guitar, voice, drums, keyboards, etc.) may be a selection priority, while proficiency levels and skill sets may be subordinate considerations. Some embodiments of the present disclosure permit such mixing of levels by compensating when song selection for performance is addressed, later. A more important factor in assembling an ensemble, 101, is that the ensemble be structured around the desire to perform a show or jam together, perhaps on the basis of a common musical interest, theme, etc. In other embodiments discussed below, an ensemble can be assembled or constructed with the aid of a computer algorithm that automatically locates suitable players to join, for example, a jam session to play a song as an ensemble based on availability, and sends push notifications or the like to invite the players to join a jam session or create a new one.

A computer implemented database of songs is assembled. The database is organized so as to have multiple dimensions through which songs can be selected. This database is now briefly described, and will be described in further detail below.

The database, 102, may be stored in any conventional database server (FIG. 2, 203) supporting relational operations. For example, the database may be housed in a SQL server. The database server (FIG. 2, 203) may be housed at an individual music studio, at a centralized location serving plural music studios, or may be distributed. Copies of the database or portions thereof may be transferred to local storage or access devices, for offline access or faster operation, if desired.

We turn now to a brief description of the content and arrangement of the database, along with the query engine by which information is extracted. These features supply a unique ability to reduce friction in the pedagogical system, making it more effective and efficient.

Because performance-based music education captures the students' interests and engages them through immersion, the instructor begins the selection of songs, 103, by determining what type of show to assemble. One slice of the database is therefore the suitability of each song for a musical show of a given theme. Songs can be rated as suitable or unsuitable for each theme, or can be rated on a suitability continuum against each theme. The instructor decides on one or more themes for a performance, and any other specific searchable characteristics desired, and enters that information, 104. Another slice of the database is instrumentation requirements for each song. Instrumentation requirements may include which instruments are necessary to the performance of a song, as well as which instruments could be used if available, but may be omitted if unavailable. The instructor enters the instrumentation, 104, available in a group of students.

Of course, each student has arrived at a current point in time having within the range of their instrument, different skill sets (i.e., techniques used with their instrument), different proficiency levels for each technique, and perhaps different stylistic interests. For each available student, the instructor enters into the query engine values for these slices of the database corresponding to each student's capabilities and desires.

Additional layers or slices of the database may, of course, be used. The foregoing exemplify several that have been found by the present inventors to reduce pedagogical efficiency dramatically, producing faster learning that is better retained by the students.

The query engine (FIG. 2, 206) extracts songs corresponding to themes for groups of students that match their learning level based on instrument, skill set, and proficiency level. The instructor or query engine groups the students into ensembles either according to typical instrumentation for performance ensembles, either manually or automatically using heuristics, to better match ensembles with available songs. Each ensemble is thus matched with a suitable show theme, from which songs are selected to engage each student to achieve that student's next level, either by increasing proficiency in current skills or by adding a new skill to the student's repertoire.

The selection of songs by the query engine (FIG. 2, 206) may be programmed to return a group of songs for each ensemble that each increase the level of one or more students in the ensemble by one level in one or more areas (e.g., known skills or proficiency levels), or may be programmed to return a group of songs for each ensemble where each song within the theme builds on the skills and proficiency levels of an earlier song, such that the group practices them in sequence so as to build a performance several levels higher than the students' capabilities at the outset of the current training period.

Students then engage in both independent (by themselves) and ensemble (together) practice and performance, 105, which guides or instructs each student precisely what they should practice and/or what skills are required at their level based on the results from the database 102, 203.

Figure 2:
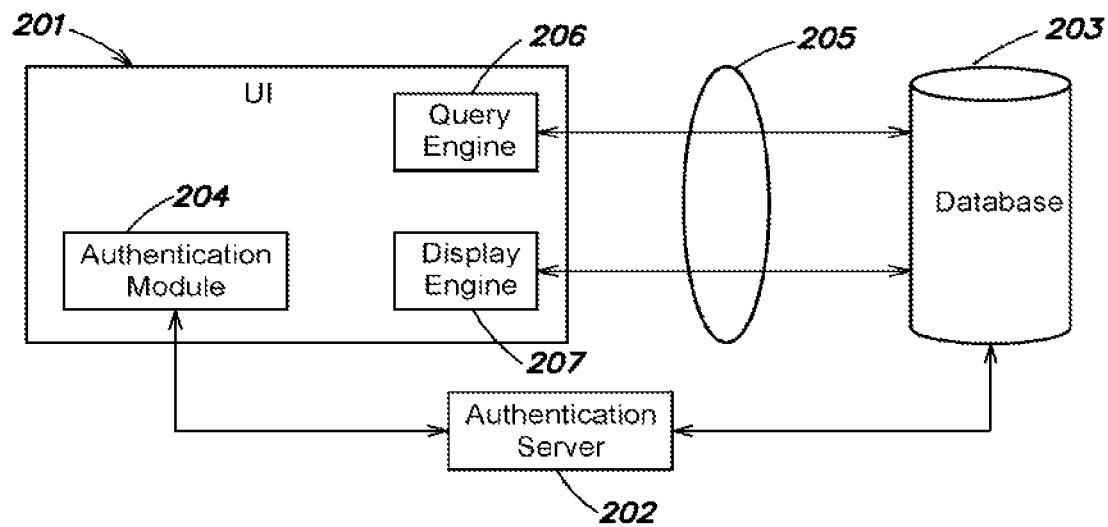
FIG. 2 is a block diagram of a computer-aided music education method according to some embodiments of the present disclosure.

FIG. 2 shows the general arrangement of a user interface, 201, authentication server, 202, and database server, 203, in which some aspects of the present disclosure may be embodied. In this embodiment, the instructor or student may enter credentials into an authentication module, 204, of the user interface, 201, in order to obtain specified access rights to the database, 203. The authentication server, 202, enables a channel, 205, to be established through which the user interface, 201, can communicate with the database, 203. Thus, the user (e.g., instructor or student) can query the database 102 through query engine, 206, and receive results through display engine, 207. Conventional authentication and access protocols and methods can provide the instructors, students, and other users each with appropriate levels of access to their requirements as defined by the needs of each within the overall educational environment and process. For example, students may be limited to searching for certain types, levels, or other groupings of materials, while instructors may be able to access, annotate, or otherwise modify the database. Alternatively, modification may be prohibited to all, or different types of annotation open to all. Numerous other combinations of access and database enhancements that permit more efficient educational use of the database are contemplated as within the scope of this aspect.

Figure 3:
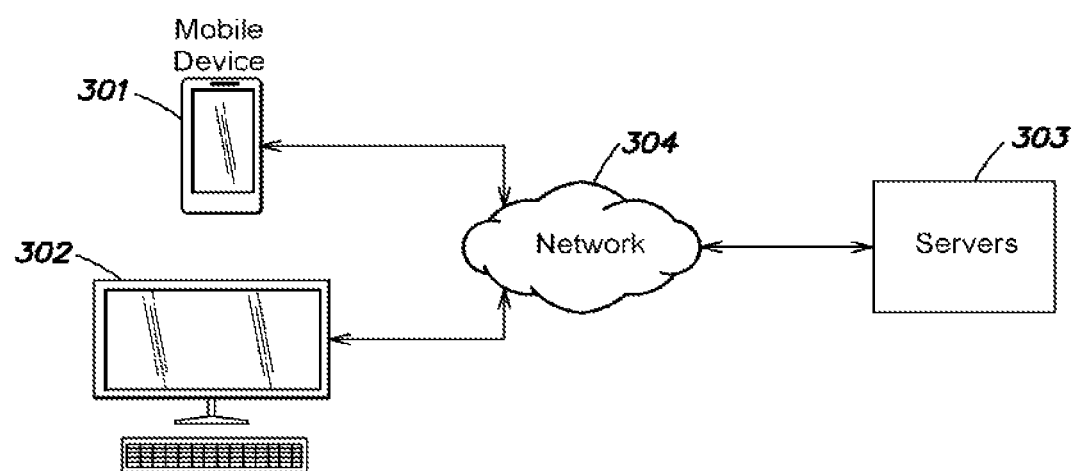
FIG. 3 is a block diagram of a music education system according to some embodiments of the present disclosure.

In general, the system according to various embodiments, as shown in FIG. 3, include mobile devices, 301, and fixed computing assets, 302, that may include input or output devices, or may have other purposes such as local caching of at least portions of the database (FIG. 2, 203). The devices and other assets, 301 and 302, communicate with one or more servers, 303, through a network 304. Network, 304, may include local or wide-area components. The network 304, may include a combination of local connections allowing access to the global internet. Thus, servers, 303, may be physically located locally to the devices and other assets, 301 and 302, that communicate with the servers, 303, or may be physically remote therefrom.

Figure 4:
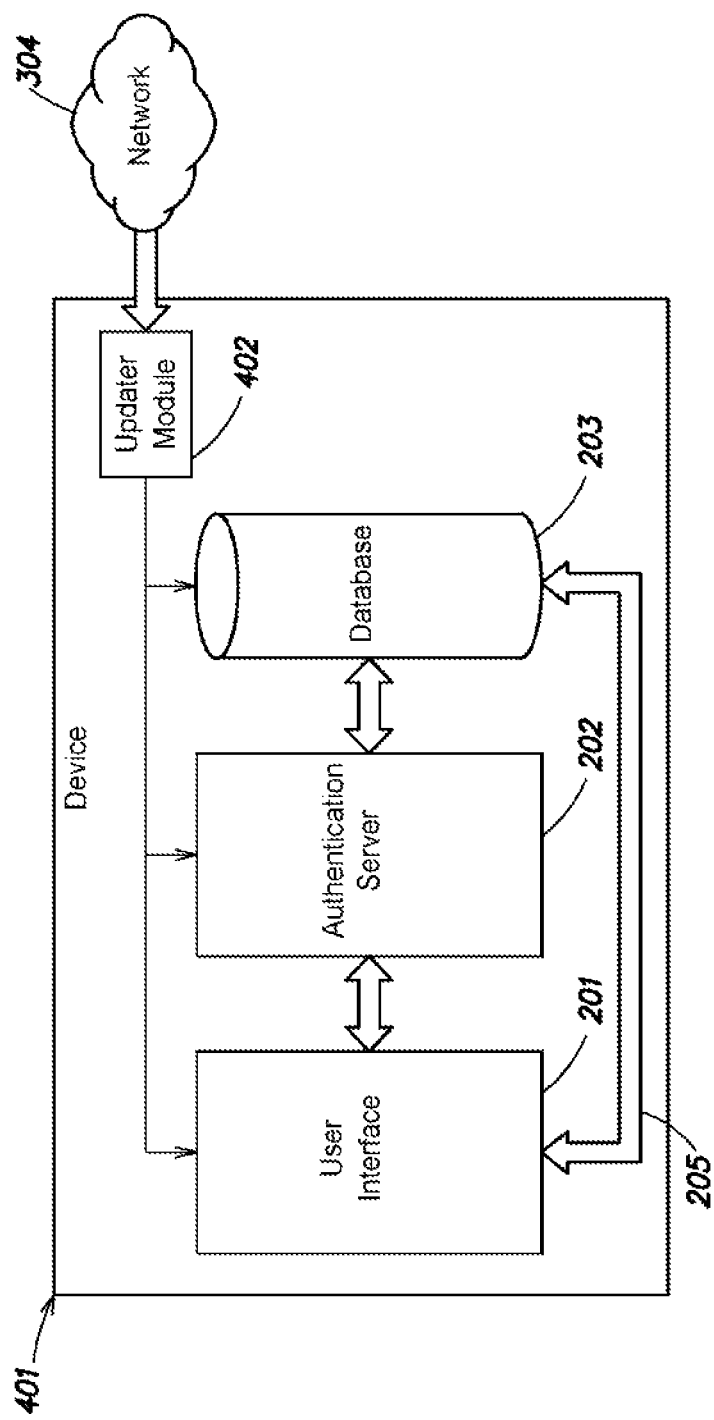
FIG. 4 is a block diagram of another music education system according to some embodiments of the present disclosure.

In an alternate embodiment, as shown in FIG. 4, a stand-alone system may be implemented in a single device, 401, or a local group of devices acting in concert as in a stand-alone mode. In such an implementation, the user interface, 201, the authentication server, 202, the database, 203, and the channel, 205, as well as the subcomponents described above are all embodied in the local device, 401, or group of devices acting in concert. Such a stand-alone device may receive database updates through a local updater module, 402, connected when needed to a network, 304, over which the database updates are communicated.

Figure 5B:
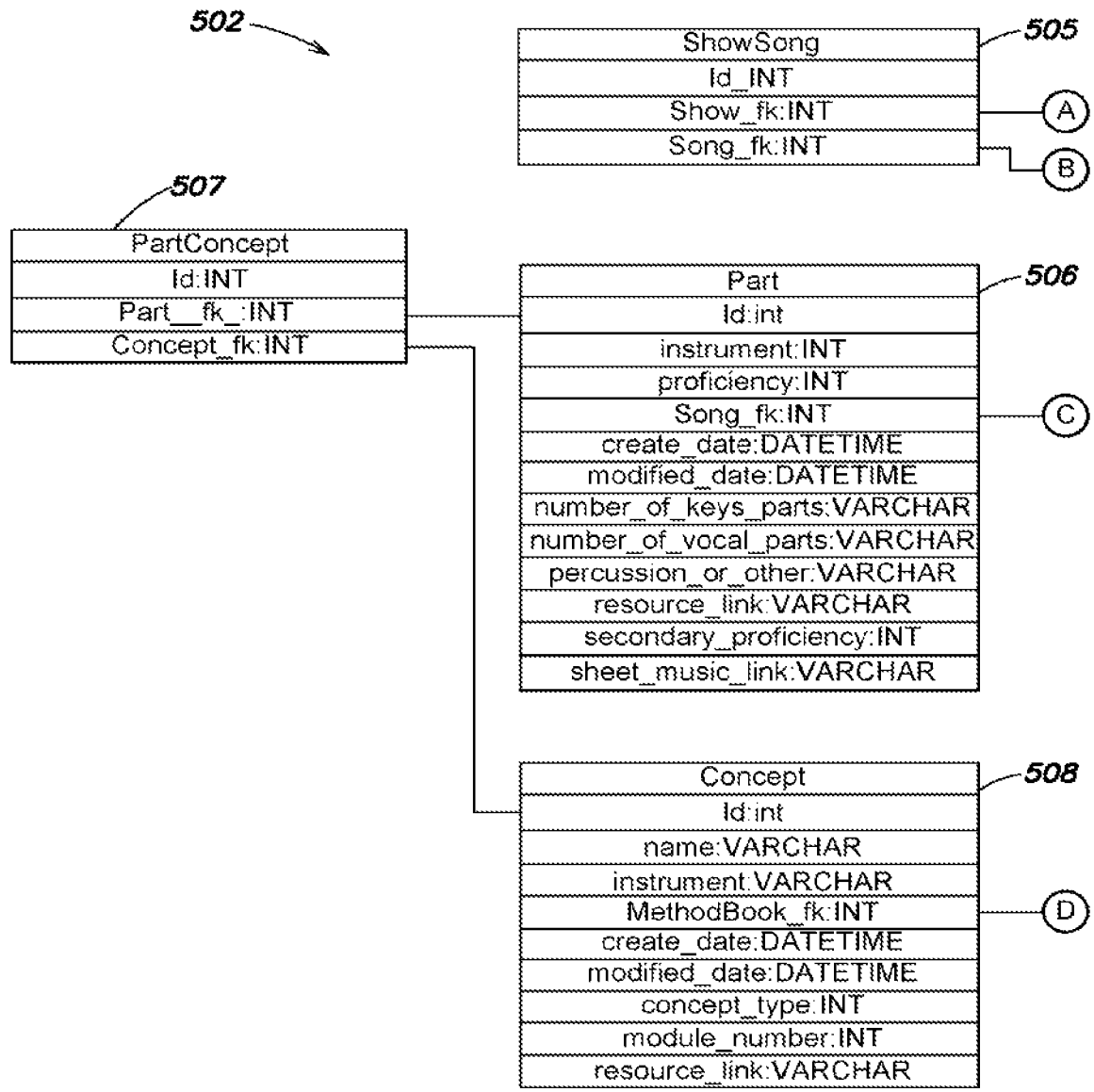
Figure 5C:
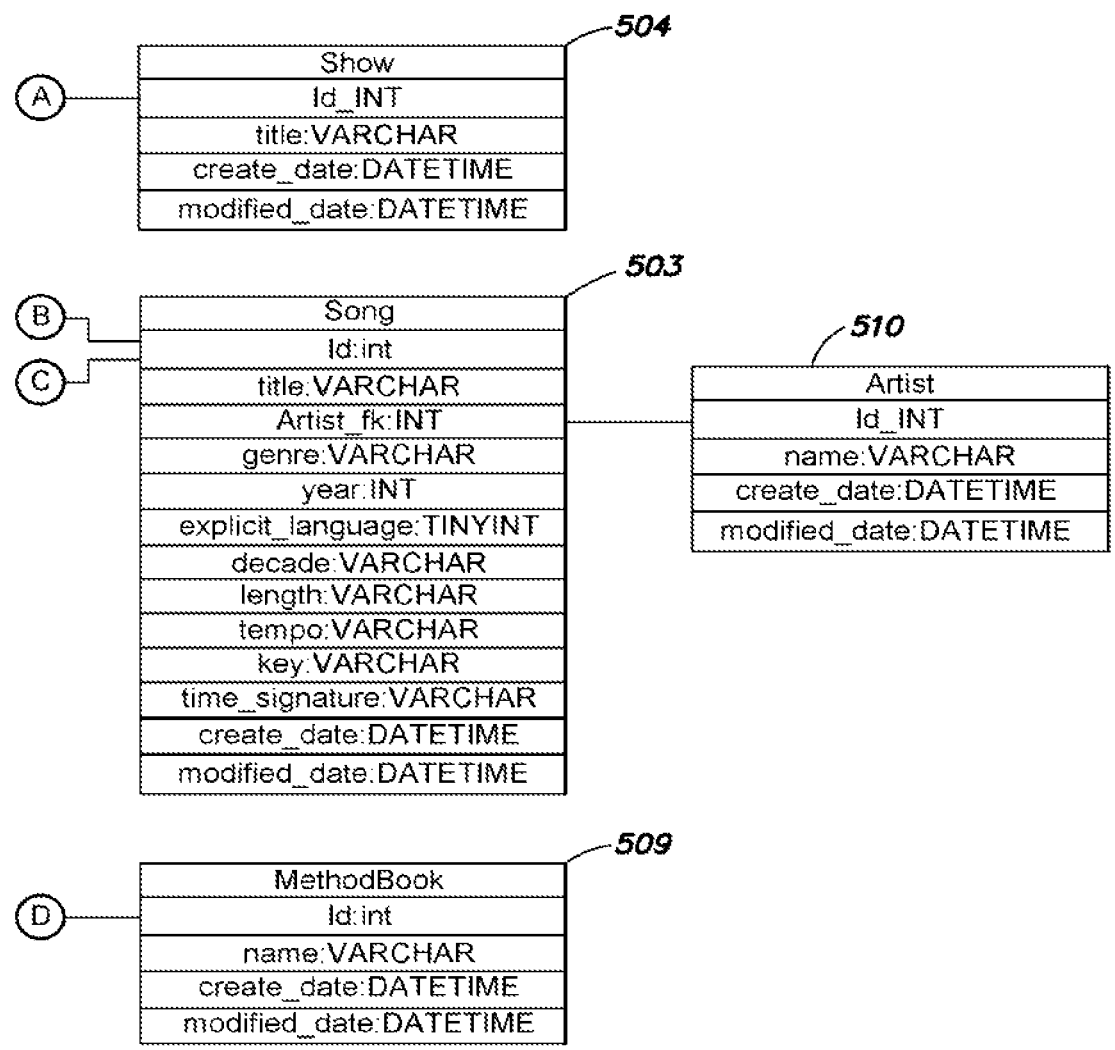

Additional details of the database are now described in connection with FIGS. 5A, 5B, and 5C, according to some embodiments of the present disclosure. FIGS. 5A, 5B, and 5C are implemented on a SQL server using the Django framework. Other database backends and frameworks can be used, and Django is merely provided as an example. Django officially supports SQLite, as well as PostgreSQL, MySQL, and Oracle.

The database 203 is preferably arranged in a multidimensional, relational structure, such as that shown in FIGS. 5A, 5B, and 5C. This structure better allows for expansion and/or contraction of the database as the catalog of songs available for performance, and therefore instrumentations, skills, and proficiency levels available to the instructor can change, as well as permitting easier restructuring of the database to incorporate other levels or slices of the song catalog to accommodate new variables found to improve pedagogical efficacy.

In the exemplary database structure, the database includes a section of authentication-related content, 501, and a section of pedagogical content, 502. Songs, 503, are linked to shows, 504, through a show-song combining table, 505. Songs, 503, are also linked to the parts, 506, required or optional for each. The parts, 506, table also characterizes the song and part according to techniques, skills, and proficiency required to perform that song. By back-linking to a part-concept combiner, 507, songs, 503, can then be linked through educational concepts, 508, to specific method books, 509, in which the source material for student access and study is identified. Optionally, the source material may also be stored in the database, so students can use their devices to directly access assigned material published through the database to them.

Shows, 504, in some implementations can be themed (e.g., songs in a musical, songs by a same artist, songs in a same musical, songs in a same genre, or some other combination of songs). A show can be a studio album, e.g., "The Wall" by Pink Floyd or from a movie, e.g., "Pink Floyd: The Wall". Songs from the studio album or songs from the music soundtrack can be grouped or linked together in the database (e.g., the database 203) using the show-song combining table, 505.

A song can have several associated parameters or information which are stored in the database (e.g., the database 203). Information for each song included in the database 203 can include a title or name of the song, an artist attributed to the song, a decade the song was released (e.g., nineties, eighties, sixties, etc.), a year the song was released, a genre (e.g., classic rock, modern rock, indie rock, funk, blues, soul, progressive rock, punk rock, metal, pop, folk, jam band, hard rock, rockabilly, roots rock, ballad, grunge, reggae/ska, jazz/jazz fusion, Latin/Latin rock, country/country rock, southern rock, garage rock, alternative rock, singer/songwriter, psychedelic rock, R&B, R&B/Soul, gospel, experimental, electronic/dance, hip-hop/rap, etc.), a key or key signature (e.g., E minor, E major, etc.), a time signature (e.g., 4/4, 3/4, 6/8, 12/8, odd meter, etc.), a number of beats per minute, tempo described on discrete scale (e.g., slow tempo defined as less than 90 beats per minute, mid-tempo defined between 90 beats per minute and 130 beats per minute, fast tempo defined between 130 beats per minute and 160 beats per minute, and very fast tempo defined as greater than 160 beats per minute), song length (e.g., in seconds, in minutes, in hours, etc.), a presence of explicit content (e.g., explicit content included or mature themes present), other characteristics (e.g., presence of I-IV-V chords, 12 bar blues, 8 bar blues, 16 bar blues, relative major/minor, key change/modulation, dynamic changes, ritardando, feel changes, simple form cadence, complex form cadence, parallel major/minor, etc.), or any combination thereof.

Songs, 503, are linked to parts, 506. A part can generally refer to a single strand or melody or harmony of music within a larger ensemble or a polyphonic musical composition. In a symphony orchestra, music can be played by a group of musicians, who all perform in unison for a given piece. For example, a dozen or more cello players may all play "the same part" even though each cello player may have her own physical copy of the music. In some implementations, a part does not require a written copy of the music; a bass player in a rock band "plays the bass part" even if there is no written version of the song. Part is thus analogous to the music component being played by a particular instrument or particular type of instrument.

Parts, 506, as represented in the database 203 can thus include an instrument (e.g., vocals, background vocals, guitar, keyboard, piano, bass, drums, percussions, etc.), a proficiency level for the instrument (e.g., in increasing level of expertise—novice, beginner, intermediate, expert, etc.), a song linked to the part, other resources for the part (e.g., a link to sheet music, a link to resources, etc.), or any combination thereof. As described above, a part is linked to an instrument, but a song can include more than one instrument of the same type (e.g., a lead guitar with a second or third guitar). Similarly, as described above in connection with a symphony orchestra, a dozen cello players can be recommended for a music piece and will play the same part. Although considered the same part, each individual cello part can be viewed as a sub-part when storing a cello part associated with a specific song in the database 203. For example, one or more secondary proficiencies can be defined for each sub-part since proficiency can be different among the different sub-parts in a song.

In an example, for a song with a lead guitar and a second guitar, a part object (e.g., as depicted by parts, 506) can be created in the database 203 for a guitar part. The part object can be populated as follows: {Part; instrument: "guitar"; proficiency: "expert"; song_fk: "Comfortably Numb"; secondary_proficiency: "intermediate"}. Instead of creating another part object for the second guitar, parameters associated with the second guitar are effectively stored alongside the parameters for the lead guitar. The part for the lead guitar requires an expert-level proficiency, while the part for the second guitar requires an intermediate-level proficiency. This mode of storing sub-parts together enhances searching speed within the database 203.

In some embodiments, other parameters can be populated based on instruments. For example, a number_of_keys_parts field in parts, 506, can be used to indicate a number of keyboard or piano parts present in the music or song. The number_of_keys_parts field can sometimes only be visible in a part object where the instrument field is "keys". Similarly, in some embodiments, a number_of_vocal_parts field can be visible in a part object where the instrument field is "vocal". The number_of_vocal_parts field can indicate a number of vocal parts present in the music or song. For example, if a song calls for a mezzo soprano and a soprano, a part object where the instrument field is "vocal" will have the number_of_vocal_parts populated with 2. Similarly, in some embodiments, a percussion_or_other field can be visible in a part object where the instrument field is "drum". The percussion_or_other field can indicate if there are other percussion type instruments alongside drums. The percussion_or_other field can be a number, similar to the number_of_vocal_parts field.

Parts, 506, are linked to educational concepts, 508. An educational concept can generally refer to musical or instrument specific techniques, theory, scales, and other musical terminology. Educational concepts, 508, as stored in the database 203, can include a name, an instrument, a concept type, a module number, other resources for the educational concept (e.g., a link to a method book or reference material with further information on the educational concept, a link to resources, etc.), or any combination thereof. The name of the educational concept is the musical terminology while the concept type is a category for the educational concept, which may be instrument specific. FIGS. 7A-7E provide examples of concept types and names of educational concepts for different instruments. As evidenced in FIGS. 7A-7E, concept types can differ based on instrument. For example, in FIG. 7A concept types for guitar include technique, concept, scale, and special tuning or effects, while in FIG. 7C concept types for drums include technique, concept, rudiment, and other. FIG. 7E, which shows educational concepts for vocal, has a concept type, range, which is not included in the other concept types provided in FIGS. 7A-7D. Concept types in FIGS. 7A-7E are provided in the header row (i.e., first row) of each of the tables. The name of an educational concept is populated in the tables, so for example, in FIG. 7B, "Gallop" is a name of an educational concept under the concept type "Technique".

Educational concepts, 508, can include other resources related to the educational concept. These other resources include a method book associated with the educational concept. A method book is a reference or instructional manual or textbook for particular musical instruments. Method books are directed at teaching certain educational concepts related to the particular musical instruments. Method books can be organized by modules or sections. Each module or section can have an identifying characteristic like a module number. For example, referring to FIG. 7D, a method book for piano can address the "bending notes" educational concept under method book 2 module number 12. In the previous example, entry of the bending notes educational concept in the database 203 can be of the form: {Concept; name: bending notes; instrument: piano; MethodBook_fk: 2; concept_type: technique; module_number: 12}. As provided in the example, not all parameters or elements of the educational concepts, 508, must be populated.

Book or method book, as used in some embodiments, refers a traditional tangible printed work consisting of pages, typically formed from paper. In some embodiments, book can also refer to electronic books like on an iPad® or Kindle®. Electronic books can also have bookmarks or other place markers that can be referred to by the module_number field of the educational concepts, 508. In some implementations, the MethodBook_fk parameter can merely be a link to method books, 509, object as illustrated in FIGS. 5B and 5C.

Although described as physical books and/or electronic books, in some implementations, information contained in the method books can be obtained online. The resource_link variable can contain a hypertext link that includes resource information about the specific method book or the specific educational concept identified by the concept name.

Educational concepts, 508, can be linked to parts, 506, using the part-concept combiner, 507, as shown in FIG. 5B. Parts, 506, are song dependent and arise from songs, 503, so a relational connection is made between parts, 506, and songs, 503. A list of educational concepts on the other hand is independent from parts or songs. Embodiments of the present disclosure provide the part-concept combiner, 507, to link different educational concepts, 508, to different parts, 506. By providing such linkage, pedagogical material associated with educational concepts (e.g., via the MethodBook_fk field and/or the module_number field in FIG. 5B) can easily be mapped on to different parts of songs. With such a mapping, the database 203 can be searched by educational concept and can provide songs that include such educational concepts. In some implementations, the database 203 can be searched by song (e.g., titles or names of songs) and can provide a list of educational concepts present in the songs. In some implementations, the database 203 can be searched by part (e.g., drums, piano, guitar, etc.) and can provide a list of educational concepts and/or a list of songs associated with the part.

Searching for songs or music in this manner enables directly connecting educational material associated with different educational concepts to be readily available for songs. For example, a student wanting to learn how to play a guitar part of "A Hard Day's Night" by The Beatles can search for the song title in the database 203. The database 203 can return the different parts in the song, including, vocals, guitar, bass, drum, etc. The student can choose the guitar part and view educational concepts expressed in the guitar part. For each unfamiliar educational concept or each educational concept the student needs more practice on, the student can readily view which method books contain information about the specific educational concept. In some implementations, a page number or module number is provided such that the student can go directly to a page or module of specific method books. Embodiments of the present disclosure thus provide an efficient means of navigating method books.

Figure 6:
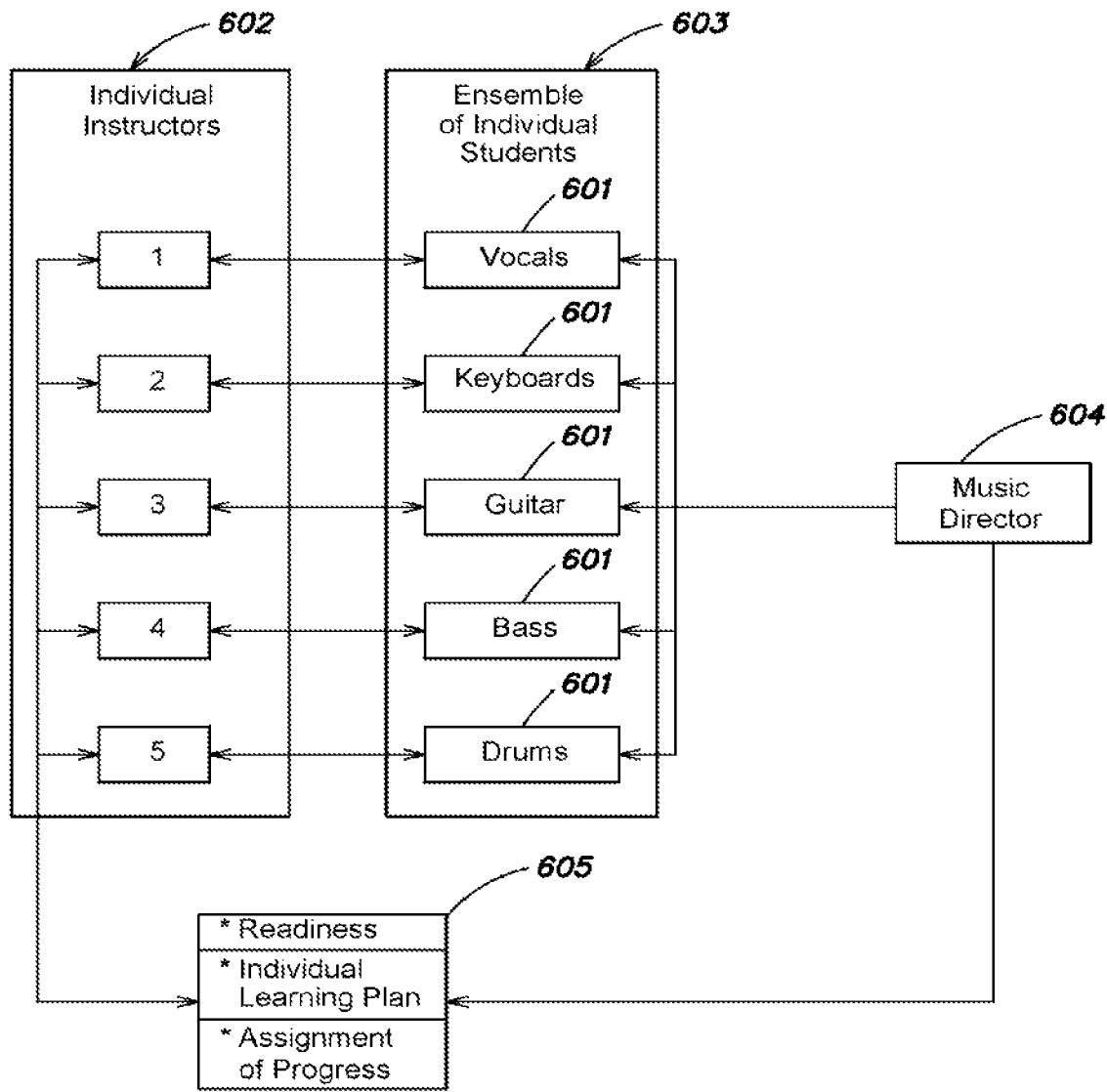
FIG. 6 is a block diagram showing an embodiment wherein the methods and structures of the present disclosure facilitate collaboration between individual instructors and ensemble music directors/instructors.

In an embodiment in a music studio environment, as shown in FIG. 6, individual students studying at different proficiency levels, 601, taught in private lessons by individual instructors, 602, can coordinate as an ensemble, 603, under the direction of an ensemble music director, 604, also an instructor, using common tools, 605, including the database (FIG. 1, 102; FIG. 2, 203) described above. Both the individual instructors, 602, and the ensemble music director, 604, determine the students' readiness, individual learning plans, and assessments of progress using the common tools, 605, in a unified manner not achieved in conventional music schools.

For example, ensemble music director, 604, employs the common tools, 605, to select songs having parts requiring techniques and skill levels suitable to an ensemble of individual students, 601. Based on progress levels fed back into the database through the common tools, 605, the individual instructors, 602, receive feedback about the capabilities and shortcomings of individual students, 601. Knowing the individual capabilities and shortcomings of the individual students, 601, the individual instructors, 602, then adjust the training of the individual students, 601, in their individual instruments, techniques, and skills necessary to achieve success both individually and in their ensemble.

Feedback can also run the other direction, that is, from the individual instructors, 602, who make observations of the capabilities and shortcomings of the individual students, 601, which are then entered into the common tools, 605, from which the ensemble music director, 604, then makes additional selections or places different pedagogical emphasis on the songs performed by the ensemble, 603.

Figure 8:
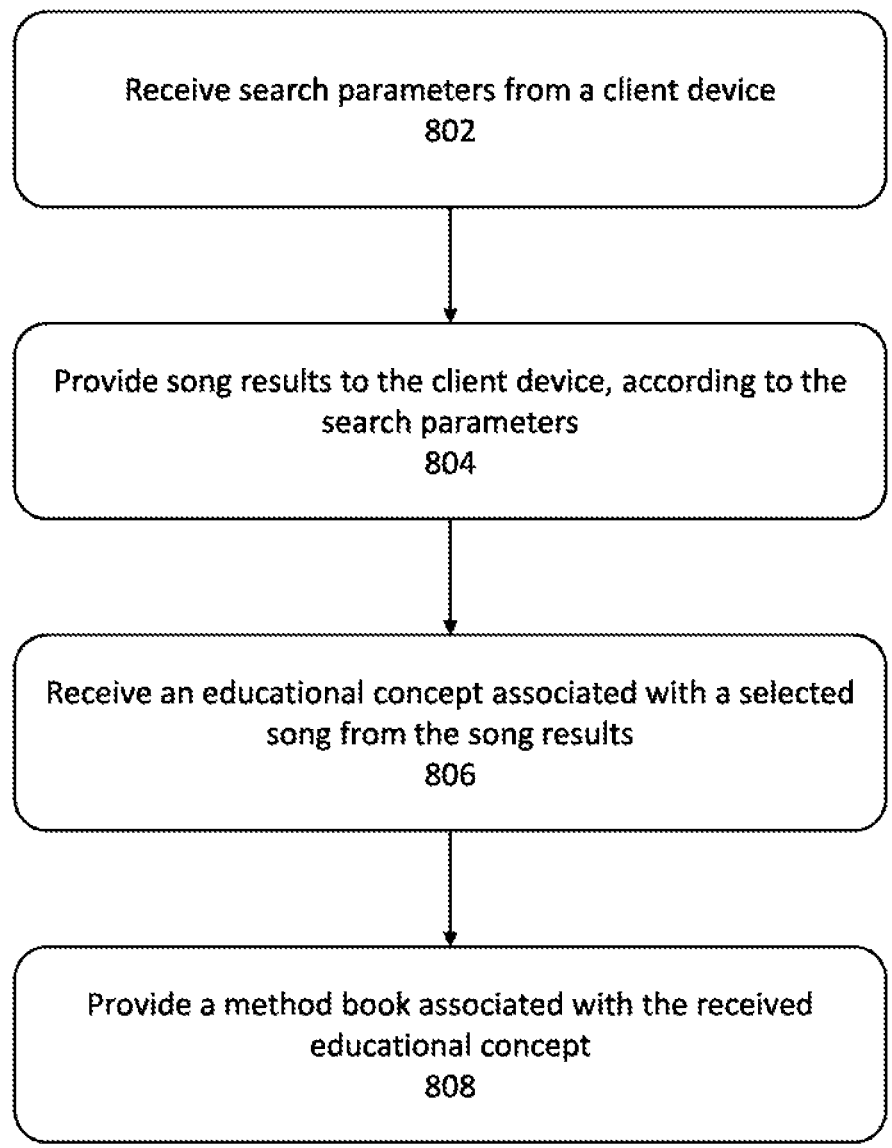
FIG. 8 is a flow diagram illustrating steps for selecting pedagogical materials for a plurality of students based on song selection, according to some embodiments of the present disclosure.

FIG. 8 is a flow diagram illustrating steps for selecting pedagogical or educational materials for a plurality of students based on song selection, according to some embodiments of the present disclosure. The steps in FIG. 8 can be performed with a system according to any of FIG. 2, 3, or 4.

At step 802, the servers 303 receive search parameters from a client device (e.g., the mobile devices 301, the fixed computing assets 302, etc.). The servers 303, in this embodiment, house the database 203 of FIG. 2 and include software that searches the database 203 and provide information to the client device. The search parameters can include different proficiency levels for an ensemble. For example, the servers 303 can receive search parameters that include an intermediate guitar part, a novice drum part, a beginner vocal part, etc. In some implementations, the search parameters include specific educational concepts, e.g., diminished triads for keys (see FIG. 7D), accent for vocal (see FIG. 7E), legato for bass (see FIG. 7B), etc. In some implementations, the search parameters include a name of a show, e.g., a television show "Cheers", a movie "Pink Floyd: The Wall", a soundtrack "The Wall" by Pink Floyd, etc. In some implementations, the search parameters include a name or a partial name of a song. In some implementations, the search parameters include a genre, e.g., classic rock, pop, etc. In some implementations, the search parameters include any of the associated parameters of a song (e.g., decade, key signature, time signature, tempo, etc.), as discussed above in connection with FIG. 5B.

At step 804, the servers 303 provide song results to the client device based on the search parameters. If a single song is returned by the servers 303, a user (e.g., an instructor, student, etc.) of the client device can further probe the returned song to view parts or educational concepts associated with the song as described above in connection with FIGS. 5A-5C. If multiple songs that fit the search parameters are returned by the servers 303, then the user of the client device can select a specific song to further probe the selected song for parts or educational concepts.

At step 806, the servers 303 can receive an educational concept associated with a selected song from the song results of step 804. That is, the user of the client device can probe the selected song by educational concept, further inquiring from the servers 303 specific information about the educational concept. For example, if the user was interested in the educational concept of ghost notes (see FIG. 7C under technique concept type), the servers 303 can receive from the client device an inquiry into ghost notes.

At step 808, the servers 303 can respond to the inquiry request by providing a method book associated with the received educational concept of step 806. For example, a method book that includes instructions or guidance on ghost notes can be provided to the client device. In another example, a page number, module, or section of a specific method book can be provided to the client device.

Although FIG. 8 is described in connection with selecting one song or selecting one educational concept, in some implementations, more than one song and/or more than one educational concept can be selected. A batch of songs can be selected, and a batch of educational concepts can be selected. The software running on the servers 303 can be amenable to both modes of operation.

Example interactions with the database 203 are provided in some embodiments of the present disclosure. These interactions can enhance student learning and an instructor's teaching in various ways. By taking a song focused approach to learning, instructors can select songs based on specific skillset of each student in an ensemble. If the instructors are mistaken about a proficiency of a student on a particular instrument, the instructor can isolate educational concepts within each song that particular students are not getting. The instructor can use some embodiments of the present disclosure to point students to specific resources, specific method books, and/or specific pages within the method books more readily. In some implementations, if instructors are mistaken about student proficiency, the instructors can filter out and/or filter in certain educational concepts by modifying search parameters in order to obtain a different song that better matches the students' skillsets. The different song selected can be a more difficult song for one or more specified parts or can be an easier song for the one or more specified parts. That is, the instructors can adjust difficulty for some students while keeping a same difficulty for other students just by mere song selection. Instructors can increase difficulty or can decrease difficulty depending on the situation and educational goals.

In this manner, instructors can pair or group students in ensembles with different skill levels while catering to individual students' needs, such that a student who is an expert in drums can play a song with a student who is a novice on the guitar. And both students can challenge themselves because the song chosen will be chosen to challenge both the expert drummer and the novice guitarist. Even though the students are playing the same song, both students will be pointed to different method books and different sections in the different method books, since they are working on different instruments at different proficiencies. This individualized insight to student needs and levels is enabled by the organization of the database 203 as discussed above in connection with various embodiments of the present disclosure.

In some implementations, the software running on the servers 303 can assemble a list of assigned work on a per student basis for a particular ensemble. For example, since each student is playing a different instrument and is most likely being directed to a different method book from another student, the servers 303 can track and store student profiles such that specific assignments or assigned work for each student is tracked. This can unburden instructors from remembering which students were assigned which sections of which method books. In some implementations, the software running on the servers 303 can automatically send emails, text notifications, or other types of electronic messages to each student with the assigned individualized method book, page, chapter, volume, webpage, etc., to study based on the selected song from the part to educational concept mapping enabled by the organization of the database 203.

Along with tracking individual assignments, a grading or feedback system can be provided by the servers 303. The instructors (e.g., individual instructors, 602, or music director, 604) can thus use the grading system to determine which educational concepts to explore for different students. Based on the selected educational concepts, songs can be selected for the ensemble of students, as described above in connection with, for example, FIG. 8.

Embodiments of the present disclosure provide a method of training students of differing skill levels to play together in an ensemble. Music teachers typically have multiple students, and these students may exhibit varying degrees of commitment, ability to learn new concepts, and musical aptitude. These student-specific qualities present a challenge for instructors to ensure that the instructors are continuously challenging students. The instructor does not want to lower the level of instruction to the detriment of a most talented student, and the instructor also does not want to increase difficulty such that only a few students being instructed are able to keep up. Embodiments of the present disclosure allow instructors to ensure that students are continuously challenged, effectively curating lessons for individual students according to their specific skill level. Embodiments of the present disclosure use an interactive application (e.g., a software app running on a phone, tablet, web interface, etc.) to monitor student progress and provide assignments to students. The interactive application can leverage the query engine (FIG. 2, 206) to find specific songs, assignments, etc., for students in the database (FIG. 2, 203).

Figure 9:
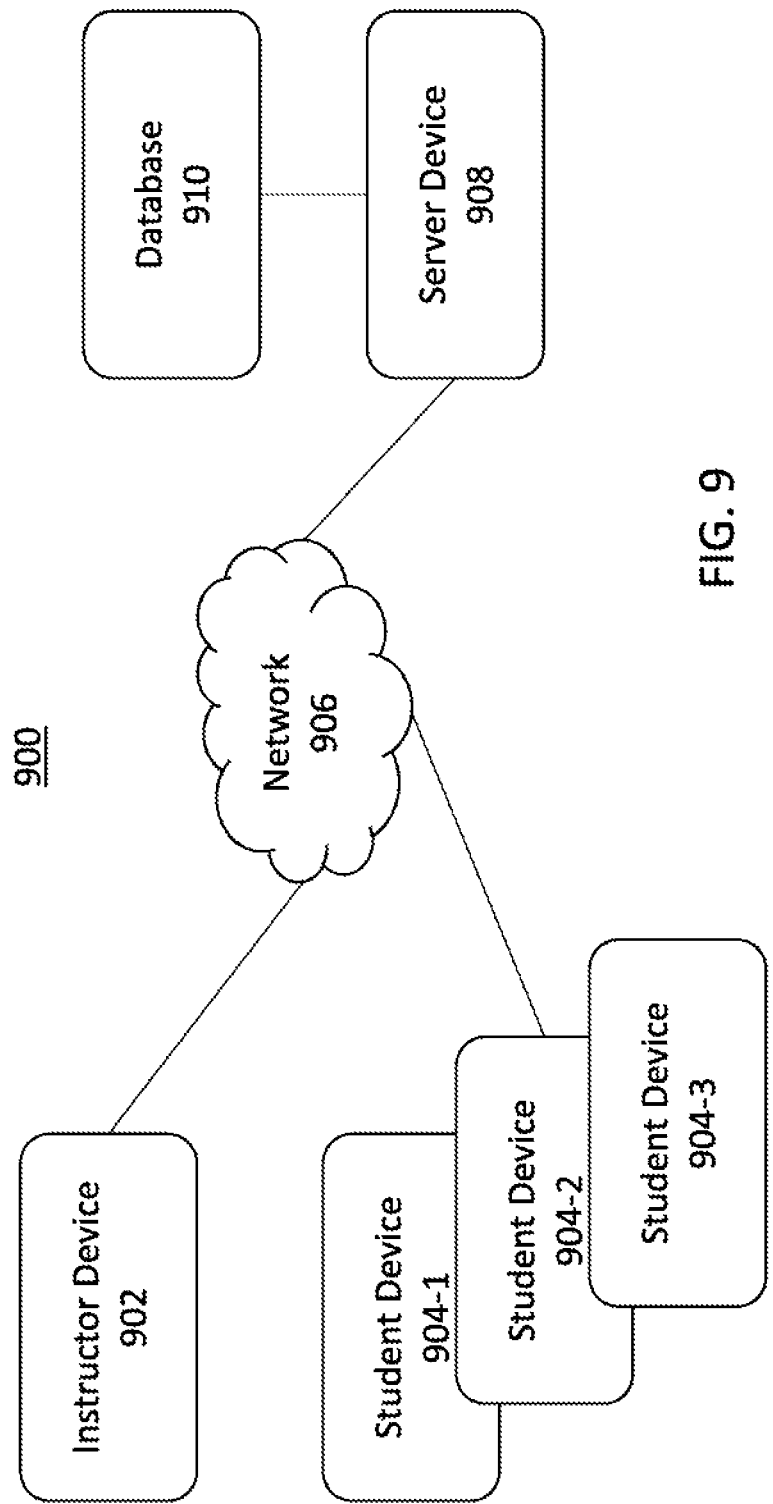
FIG. 9 is a block diagram of a music education system for facilitating individualized instruction, according to some implementations of the present disclosure.

An example will be used in illustrating the interactions between the students and the instructor. Referring to FIG. 9, a music education system 900 for facilitating individualized instruction is provided. An instructor (e.g., individual instructors 602 of FIG. 6) uses an app on an instructor device 902. A first student (e.g., individual students 601 of FIG. 6) uses an app on student device 904-1, a second student uses an app on student device 904-2, and a third student uses an app on student device 904-3. The instructor device 902, the student devices 904-1, 904-2, and 904-3 are client side devices. These client side devices can be desktop computers, laptop computers, tablets, smartphones, etc. These client side devices connect to a server device 908 using a network 906. The network 906 is analogous to the network 304 of FIG. 3. The server device 908 provides support for a database 910. The database 910 is analogous to the database 203 (FIG. 2) already described above in various embodiments. The database 910 can be arranged as described above in connection with FIGS. 5A, 5B, and 5C. The server device 908 runs various programs for searching the database 910 and runs various programs for enhancing functionality of the app running on the instructor device 902 and each of the student devices 904-1, 904-2, and 904-3.

Figure 10:
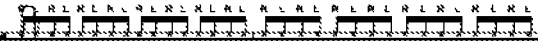
FIG. 10 is a graphical user interface example displayed on an instructor device for providing assignments to students.

In FIG. 6, the ensemble music director 604 assigns a song to be played by the ensemble of individual students 603. The music director 604 can search the database 910 by artist, genre, show, etc., to find songs for the ensemble 603. The individual instructors 602 can use the common tools 605 to guide the students 601 in the ensemble 603 in order to improve technique and proficiency level of the students 601. Referring to FIG. 9, the instructor can use the instructor device 902 to create assignments related to the selected song. FIG. 10 provides an example graphical user interface (GUI) 1000 when creating an assignment for a student. The instructor device 902 displays the GUI, allowing the instructor to (1) select which student the assignment will be assigned to, (2) provide comments or text guidance to the student, and/or (3) limit the number of attempts the student has to complete the assignment. The instructor can therefore curate assignments for individual students.

In an example, the first student using the student device 904-1 is a beginner student, the second student using the device 904-2 is an intermediate student, and the third student using the device 904-3 is an expert student. Usually, these students would not be grouped to play together because music schools typically group students by ability so that instructors can better help students. Embodiments of the present disclosure allow these students to play together in an ensemble, with the instructor being able to tailor assignments to individual students without having to have expert students being stuck with non-challenging assignments for their skill level. Using the GUI 1000 of FIG. 10, the instructor device 902 can assign the first student, the second student, and the third student different assignments that are tailored for the student.

The instructor can select the assignments according to some implementations of the present disclosure. For example, based on the song assigned for the ensemble, the instructor can decide that the beginner student needs to develop certain skills and can search the database 203 for specific songs that contain one or more of the techniques or educational concepts that the beginner student should learn. As described above in connection with FIG. 8, specific locations in a method book can be provided to the instructor based on the search of the database 203. The instructor is then able to incorporate the specific locations in the method book into the assignment created for the beginner student. Although described for the beginner student, a similar procedure can be used for the intermediate and expert students. The instructor can search the database to determine specific locations and specific books to use to develop certain skills and techniques for each of the students. The assignment provided to each of the students can be different based on proficiency level, instrument type, etc. Specific method books can differ based on proficiency level, thus, the method books being used by an expert student can be different from the method books being used by a beginner student. The instructor is able to select assignments in different method books based on searching the database 203.

Figure 11:
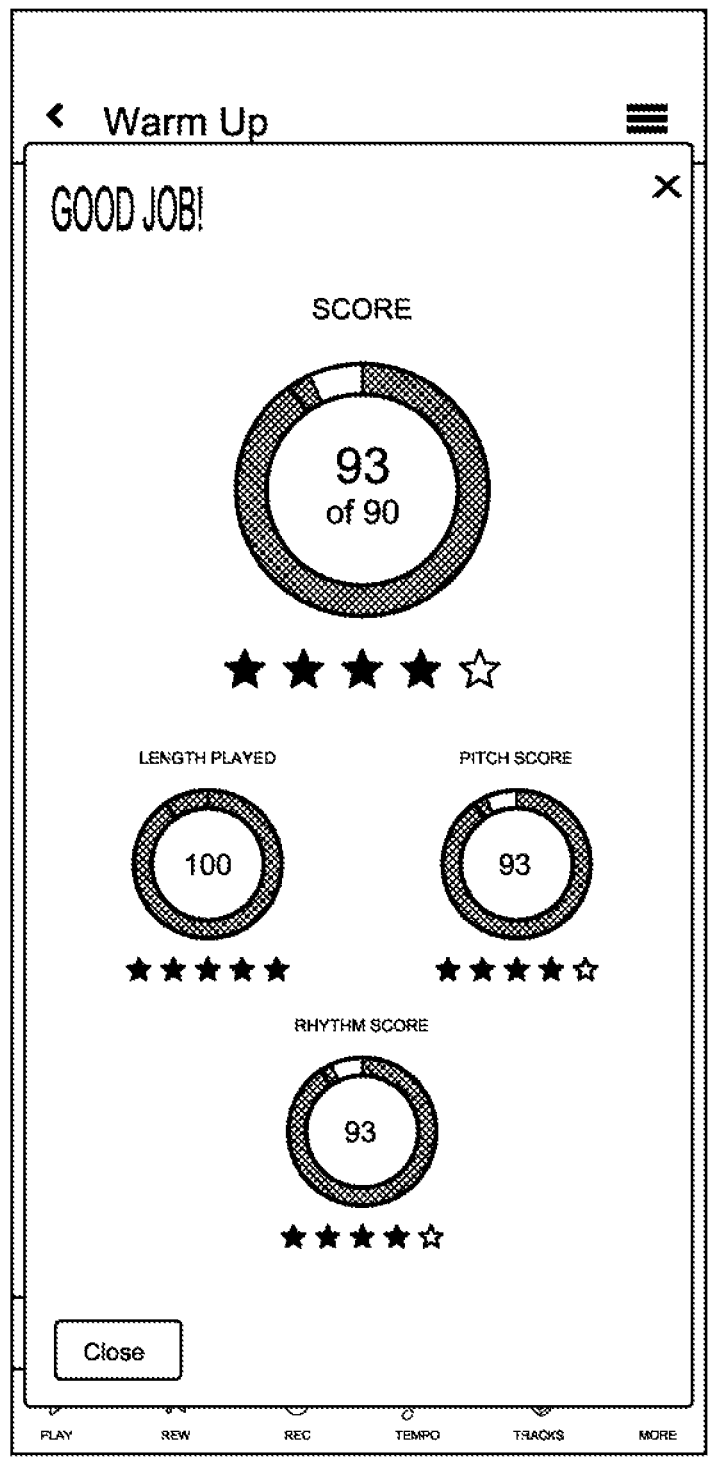
FIG. 11 is a graphical user interface example showing overall and segmented scores for a first student.

In an embodiment, the assignments for each of the students are stored on the server device 908 such that when the students log in on the student devices 904-1, 904-2, 904-3, the students get a notification of a new assignment and are prompted to complete their assignment. The students can log in to the app on the student devices 904-1, 904-2, 904-3 and practice the assigned exercises. The app can assess the students' playing and offer an overall score based on what the student plays. The app in some embodiments can provide segmented scores, for example, the app can provide specific feedback on rhythm, pitch, and notes played. FIG. 11 provides an example screenshot of an example GUI 1100 showing an overall score of 93 out of 90, a length played score of 100 indicating that the student played the entire assigned exercise, a pitch score of 93 indicating that there are some notes that the student missed or made a mistake on, and a rhythm score of 93 indicating that the student was not perfect on tempo. In some implementations, each of the aforementioned scores can be accompanied by a rating as shown in FIG. 11. The rating can be a star rating (e.g., four out of five stars, three out of five stars, five out of five stars, etc.).

The scores provided in FIG. 11 are merely examples. The app running on the student devices 904-1, 904-2, 904-3 can use any scoring system or scoring engine. In some implementations, the scoring engine is based on a MATCHMYSOUND™ scoring module. In some implementations, the scoring engine is based on SMARTMUSIC® scoring module. The scoring engine facilitates providing students with feedback on how well each individual student performs their individual assignment. The scoring engine automatically monitors progress by recording real-time musical notes of an exercise played by a musical instrument or sounds of a vocal song and calculates a score indicative of a mastery of the exercise played by the musical instrument or the vocal song. The GUI 1100 in FIG. 11 can be provided to the first student on the student device 904-1. Similarly, when the instructor logs on on the instructor device 902, the instructor can see the GUI 1100 in FIG. 11 as feedback to how the first student performed on the assigned exercise. In addition to the GUI 1100, the instructor can listen to what the first student played (i.e., the app on the student device 904-1 captures the sound being played by the student for the instructor to evaluate later on). Based on the captured recording of the first student's playing and the score provided by the scoring engine incorporated in the app for the first student, the instructor can determine that the student is making progress on the exercise. The instructor can, at this point, determine to increase difficulty by assigning the same assignment but at a higher tempo and/or a higher proficiency goal. For example, instead of aiming for a score of 90 on the exercise, the instructor can increase the goal to 94, 95, 96, etc. In another example, instead of keeping tempo at 100 beats per minute, the instructor can increase tempo to 120 or 140 beats per minute and then reassign the exercise. In some implementations, the instructor can determine that the first student has mastered the specific exercise and assign a different exercise to develop a different skill or technique required for the song assigned to the ensemble.

Figure 12A:
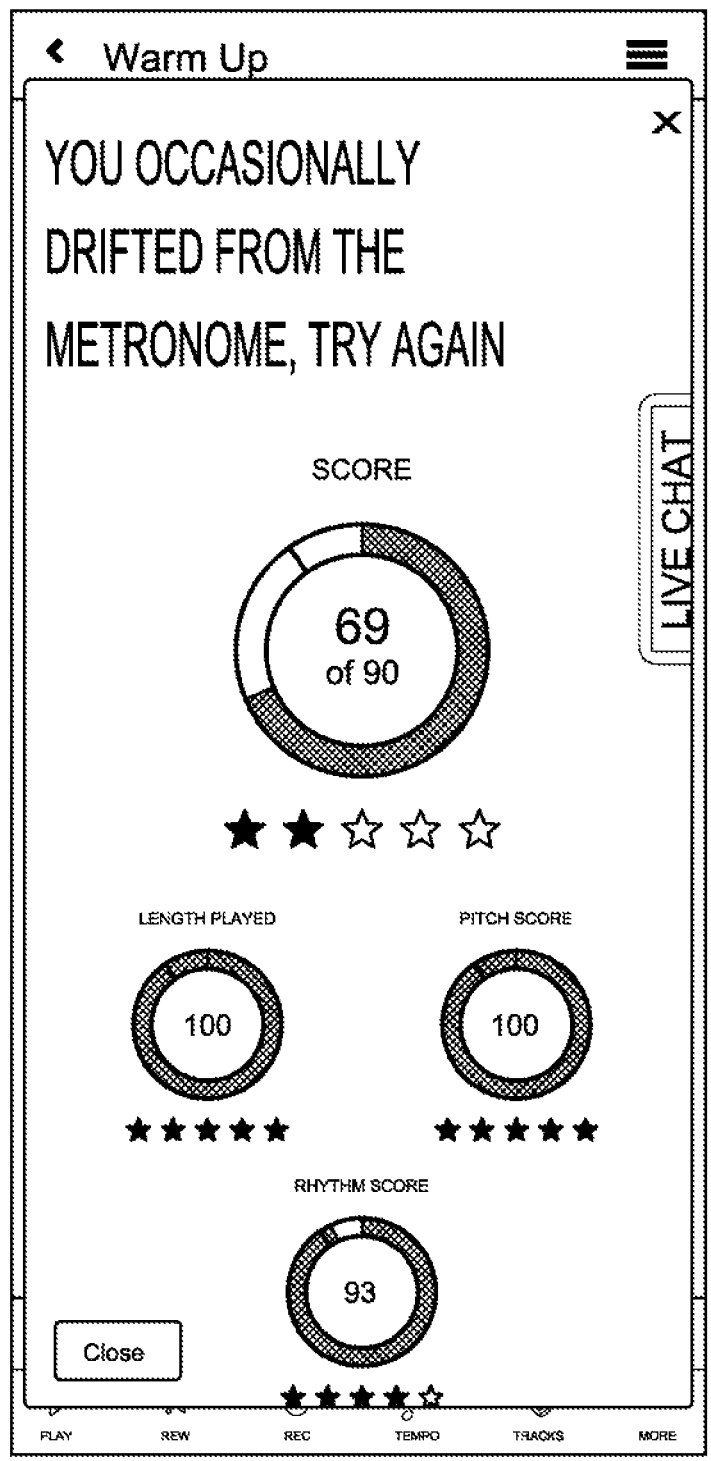
FIG. 12A is a graphical user interface example showing overall and segmented scores for a second student in a first assignment.
Figure 12B:
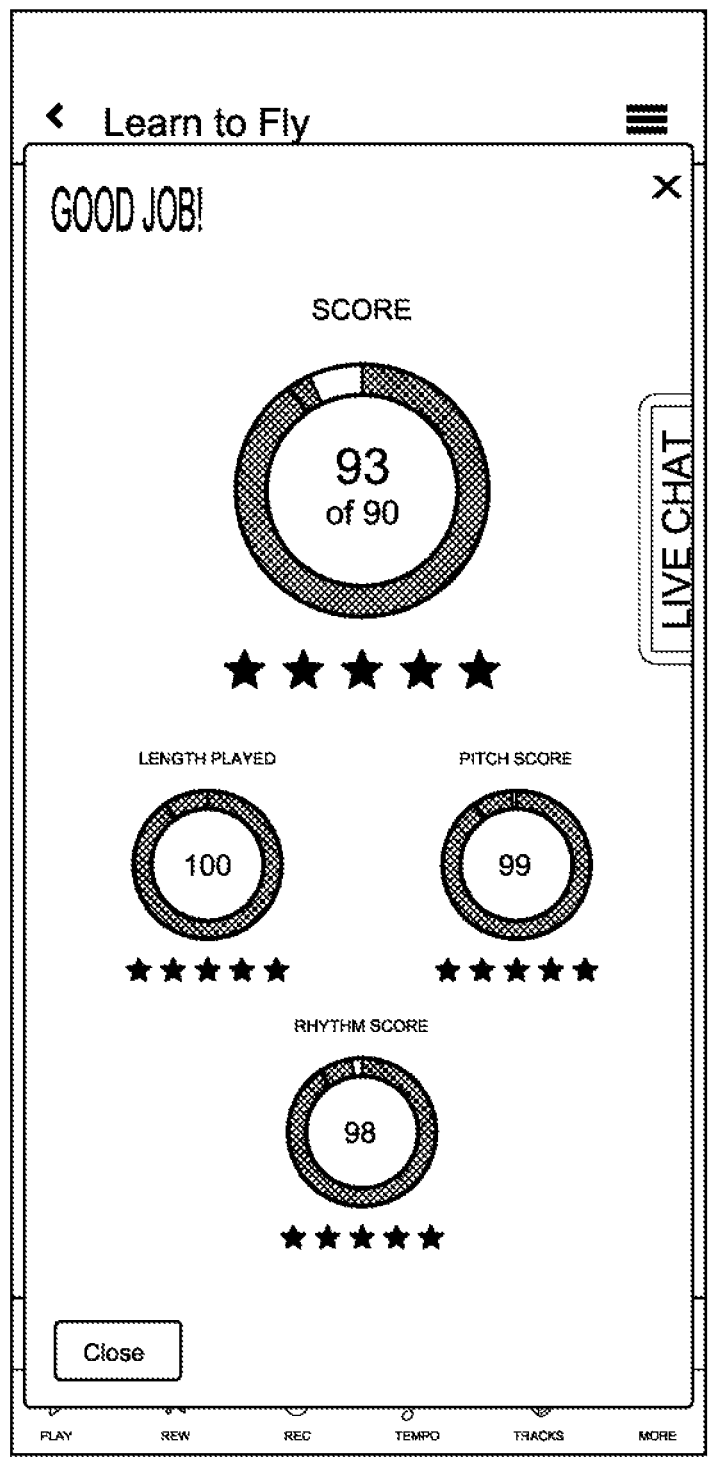
FIG. 12B is a graphical user interface example showing overall and segmented scores for the second student in a second assignment.

The second student, the intermediate student using the student device 904-2, can get a score assessment via a GUI 1200*a* provided in FIG. 12A. Although the pitch score and length played are scored at 100, the rhythm score is very low, causing the overall score to be a 69 out of 90. Feedback can be provided to the second student (e.g., "You occasionally drifted from the metronome, try again"). When the second student's overall score does not meet the target of 90, the automated feedback can be used to guide the second student on how to improve the overall score on the next try. In some implementations, when the score assessment in FIG. 12A is shared with the instructor on the instructor device 902, the instructor is able to further determine several factors associated with the lower score. For example, the instructor can look at the number of attempts the student tried prior to submitting the score to determine an amount of effort the second student put in the assignment. A single attempt and a low score can indicate that the student did not put in much effort, while multiple attempts (e.g., five, six, ten, etc.) and a low score can indicate that the assignment may be too challenging for the student. The instructor can determine that the student may not be ready for the challenge and can find an easier exercise to work on. The instructor can search the database 203 for a related exercise that is geared to a lower proficiency level. The instructor can then see whether the second student's score improves with the new exercise. FIG. 12B shows an example GUI 1200*b* that can be shared with the instructor via the app installed on the instructor device 902.

The search functionality described according to some implementations of the present disclosure allow determining exercises appropriate to different student levels. By using an app, instructors can search for appropriate exercises and assign those to students of varied proficiencies that will play together in an ensemble. The students are able to receive the assigned exercises on their devices and perform their assignments. The students can receive immediate feedback from a scoring engine, and each student's score can be shared with the instructor. Based on the score, the instructor can determine that an easier exercise should be assigned to the student, the same exercise should be assigned but with different parameters (e.g., tempo, goals, etc.), or a new exercise should be assigned to develop a prerequisite skill. A beginner student can have different assignments than an intermediate student, who can have different assignments than an expert student. The instructor can use the scores to tailor the assignments for the students. The apps installed on the instructor device 902 and the student devices 904-1, 904-2, 904-3 facilitate the tailoring of assignments for the students and receiving feedback regarding each of the assignments. The assignments for each student can come from different method books and/or different sections of the same method book.

Figure 13:
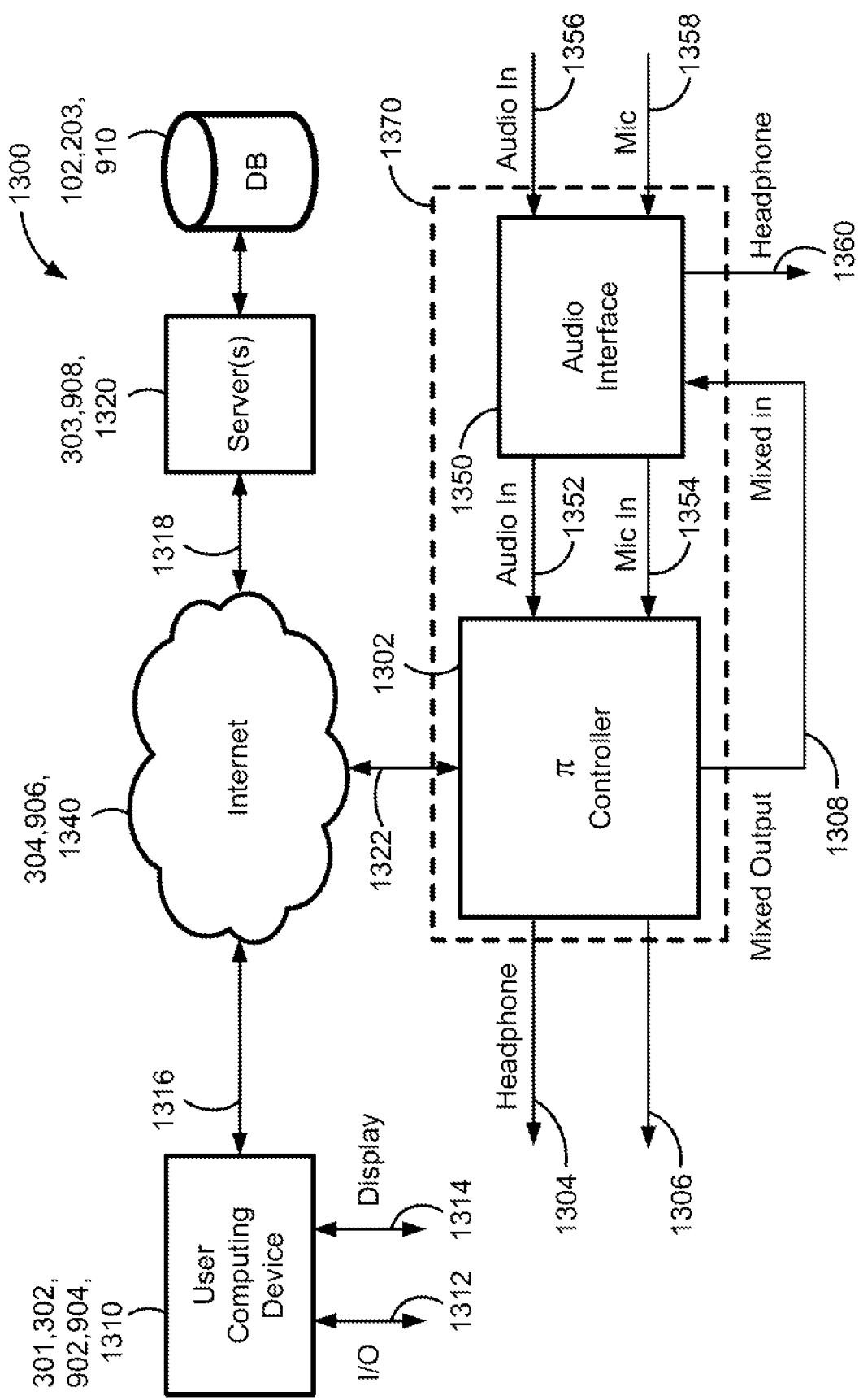
FIG. 13 is a functional block diagram of a system for facilitating a live jam session featuring live audio of a song produced by human players and which is mixed in real time to produce a mixed audio output.

FIG. 13 is a functional block diagram of a system 1300 to facilitate a live jam session featuring live audio of a song produced by human players and which is mixed in real time to produce a mixed audio output. The song is automatically recommended by a song recommendation engine described in more detail below.

The system 1300 includes an electronic controller 1302 having a low-latency audio performance, where the latency is under 50 ms or under 30 ms or under 20 ms. The system 1300 includes an audio interface 1350 including an audio input 1356, 1358 to receive sound from a microphone or from a musical instrument played by the human player associated with the user of the controller 1302. The audio interface 1350 can include a conventional headphone output 1360. The controller 1302 has an audio input 1352 carrying an audio signal outputted by the audio interface 1350, and a microphone input 1354 carrying a microphone sound signal outputted by the audio interface 1350. The controller 1302 can include a conventional headphone output 1304 and another output 1306 that outputs a representation of audio processed by the controller 1302 or data. The controller 1302 includes a conventional communications interface to communicate over a wired or wireless link 1322 to a computer network 1340, such as the Internet, which can also be the network 304 or 906 described above. The controller 1302 can include a mixed output interface 1308 configured to output a mixed audio output signal from multiple sound producing sources to the audio interface 1350 as a mixed audio input. The controller 1302 together with the audio interface 1350 form a client device 1370.

The system 1300 includes a server 1320 communicatively coupled to the controller 1302 via a computer network 1340 over the link 1322. The server 1320, which can embody or include all structure and functionalities of the server 303, 908 described above, is communicatively coupled to the computer network 1340 via a wired or wireless link 1318. A user computing device 1310 is communicatively coupled to the computer network 1340 via a wired or wireless link 1316. Examples of the user computing device 1310 can include a mobile smartphone, a laptop, or tablet personal computer. The user computing device 1310 includes an I/O interface 1312 for interfacing with an I/O device and a display interface 1314 for interfacing with an electronic video display. The user computing device 1310 can include or embody any of the devices or assets 301, 302, 902, 904 disclosed herein, including all structures and functionalities thereof. The server(s) 1320, 303, 908, which can be one or more computer servers, can be communicatively coupled to the database 102, 203, 910 disclosed herein, or the database 102, 203, 910 can be communicatively coupled to the computer network 1340, 304, 906 as shown and described in connection with FIG. 4.

The server 1320 is configured to retrieve a musical instrument played by the player and a proficiency level of the player operating the client device 1370, and to initiate a jam session in which the controller 1302 is assigned to be a host of the jam session. This "song-based" jam uses the server 1320, 303, 908 to locate a song or a set of songs by interrogating the database 102, 203, 910 that best satisfies dimensions of the participants to a jam session. Alternately or additionally, the server 1320 can be configured to automatically select proposed participants to join a session based on a selection of one or more songs. The server 1320 can include a scoring algorithm that determines one or more players who would be best suited to play the selection of song or songs. The scoring algorithm can use the same dimensions that are used to determine a song to be played by a musician player as disclosed above. Additionally or alternately, the scoring algorithm can take into account and provide a higher weight to affinities, such as a common affinity among the players (e.g., all seniors in high school, all participating in the same event), user profiles including user preferences, affinities, or associations stored therein, player age (e.g., minors versus adults), whether the player prefers the forum to be moderated (e.g., pedagogical) or unmoderated (e.g., freestyle jam), player genre/style preferences, time zone where the player is located, or physical distance or proximity among the players from one another. When the server 1320 identifies a proposed participant to join a jam session or live performance, the server 1320 can automatically send a push or other notification to the proposed participant, along with a link to connect to the jam session or live performance.

Figure 14:
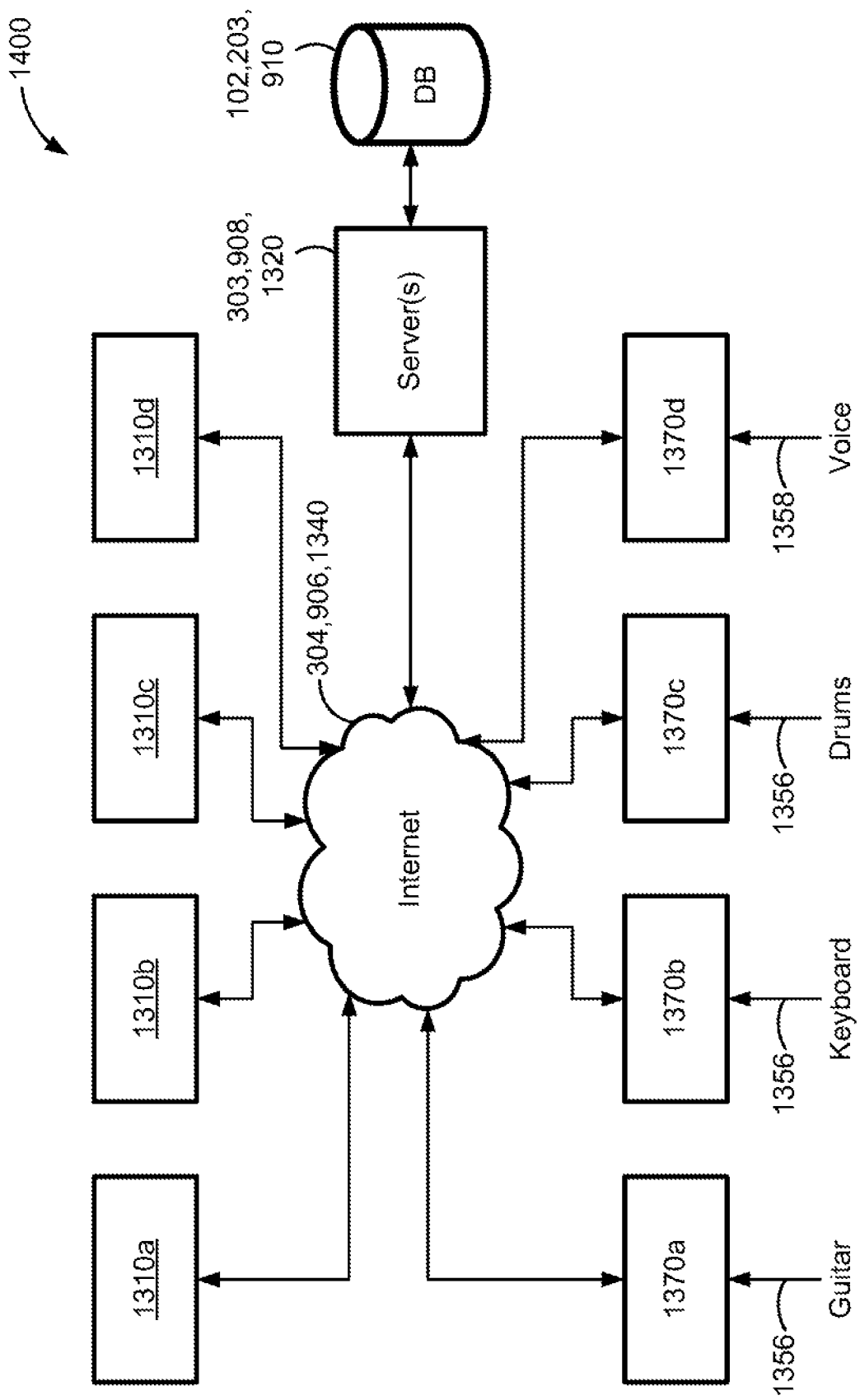
FIG. 14 is a functional block diagram of multiple client devices communicating over a computer network to form an ensemble to play a song recommended by a song recommendation engine.

FIG. 14 is an example system 1400 of an ensemble of four players operating a client device 1370a, 1370b, 1370c, and 1370d to create a mini-network. Many other such mini-networks can be created across the system 1400, with each mini-network conducting its own session with its set of player users. Each client device 1370a,b,c,d is based on the client device 1370 disclosed in connection with FIG. 13. In the example system 1400 shown in FIG. 14, the first client device 1370a is operated by a player who plays the guitar, the second client device 1370b is operated by a player who plays the keyboard, and the third client device 1370c is operated by a player who plays the drums. The fourth client device 1370d is operated by a singer who sings and supplies a voice as an input to the microphone input 1358. As used herein, the term "musical instrument" encompasses a singer's voice, where the singer's voice box operates as the instrument. This four-person ensemble can be physically distant from one another, e.g., not present in the same room or building, such as playing their respective musical instrument from their respective dwelling.

The server 1320 is configured to retrieve a musical instrument played by each of the players operating the client devices 1370a,b,c,d and a proficiency level of each of the players. The server 1320 can invite any of the users associated with the client devices 1370a,b,c,d to join the live jam session, or the server 1320 can accept a request by any of the users to join the jam session. The server 1320 recommends to the users a song to be played during the jam session based on at least the respective musical instruments played by the players and the respective proficiency levels of the players.

During the jam session, the respective audio inputs from the client devices 1370a,b,c,d are mixed in real time to produce a mixed output. The mixing can be carried out by the controller 1302 of one of the client devices 1370a,b,c,d that is assigned to be the host, or the mixing can be carried out by the server 1320 and broadcast to each of the client devices 1370a,b,c,d simultaneously. A representation of the mixed output is live-streamed via the computer network 1340 for simultaneously playback on one or more computing devices, such as the computing devices 1310a, 1310b, 1310c, 1310d shown in FIG. 14, which are based on the user computing device 1310 disclosed in connection with FIG. 13.

The controller 1302 can operate as a headless system, and an operating system running on the controller 1302 can be optimized for the low-latency audio performance. Examples of a suitable operating system include RASPBERRY PI, DIETPI, RASPBERRY PI ZERO, or PATCHBOX OS. The controller 1302 can include the minimum hardware necessary to operate an operating system optimized for low-latency audio performance and sound channeling. The more streamlined and "thin" the device, the better, as the critical function of the controller 1302 is to provide the audio from instrument-to-cloud with as little time latency as possible, preferably below 50 ms or 30 ms or 20 ms. Audio has the highest priority for synchronization over any other hardware interrupts (which can be disabled) or background processes (which can also be disabled). Any manipulation of the audio signal (compression, packet size, etc.) prioritizes lowest latency above other functions.

The controller 1302 is configured to recognize common audio interfaces and any audio inputs that are received from that audio interface, and is configured to plug-and-play with as many common USB audio interfaces as possible. The controller 1302 can optionally connect to a video display (not shown) and can connect to a capture device (not shown) via a LAN, or another type of connection (USB, BLUETOOTH), to be able to route mixed audio from the controller 1302 into a jam session. The display and capture device is configured to manipulate the audio levels within the jam session that are coming from the controller 1302, or to add audio manipulation (effects, equalizer, reverb, delay, distortion) as a host or a participant to the jam session.

Each controller 1302 or client device 1370 can act as a host for the jam session, so as not to rely on a central server 1320 to act as the host of the session, which would add another stop that all packets would have to pass through and would add latency. The server 1320 facilitates song selection, but does not necessarily have to be involved in routing or broadcasting the mixed audio signal among the client devices 1370a,b,c,d, which can communicate directly among themselves in the mini-network created for the jam session.

While any of the client devices 1370a,b,c,d can be assigned to be a host, the client device 1370a,b,c,d with the lowest latency can be assigned to be the host, or which client device 1370a,b,c,d serves as the host can be dynamically assigned based on lowest latency to the computer network 1340. A "live jam session" and "concert" are used interchangeably herein. Any assembly of persons playing a musical instrument (or reading poetry or lines, such as for a film or TV script or a play) is contemplated as constituting a jam session or concert (or reading session or short).

The system 1300 can include spectator user devices, which passively playback the streamed representation of the mixed output of the live jam session. The spectator user devices do not need to have any specialized controller like the controller 1302 to listen to a live jam session or a concert. For example, any of the user computing devices 1310a,b,c,d shown in FIG. 14 can be a spectator user device, which receive a link to connect to a live jam session or concert. The server 1320 will also broadcast the mixed audio constituting the live jam session or concert to each connected spectator device. A live chat feed can be hosted by the server 1320 to support live chat or comment during the live jam session or concert. During the performance of the live jam session or concert, the server 1320 can mute or prohibit any or all of the spectator user devices from introducing any audio into the mixed output. During a selected time during the live jam session (or concert) or following performance of a song of the live jam session, activating a respective microphone of each of the plurality of spectator user devices such that the audio representation of sounds inputted to the respective microphones are mixed in real time with the mixed output. For example, during this "live mic" period, the audio representation can be sound of spectator humans operating the spectator user devices applauding or audible cheering the performance.

Effects such as a reverb, delay, or similar effects can be added by the operator of the client device 1370*a,b,c,d* as the player is playing the instrument, or these effects can be added by the client device assigned as the host of the session, or the effects can be added under control of the server 1320.

The server 1320 can be configured to find users that would be suitable to form an ensemble, such as by reviewing user profiles and extracting information about the user's proficiency level, theme preference, musical instrument(s) played, and song preferences. The jam sessions herein can be described as "jam on demand," or "drop in jamming." Jam on demand provides a service where any ensemble of players can initiate a jam session on demand at any time. Drop in jamming refers to a service where a new player, for example, can "drop in" on an ongoing jam session, akin to so-called Zoombombing, but in a welcoming manner. The then-host of the jam session can include as a host privilege the ability to remove or mute any player from participating in the jam session.

In an example implementation, a player can receive a prompt (e.g., by email or text) or push notification from the server 1320 to join an ensemble that is about to begin a jam session. The player can be selected based on the user profile, social media posts, educator or teacher, for example. The server 1320 can mine profiles to harvest information that is stored as a fingerprint for that player. Likewise, a would-be spectator can receive a prompt or push notification to listen to a jam session underway or that is about to begin and become an actual spectator. The server 1320 can scrape information from or about a player's music subscription or service account, online ticket broker account, which method book the player is working on, which shows or songs or exercises the player has completed, actual proficiency, e.g., as assessed by an instructor using a rubric, self-reported profile information, the player's music affinity or affinities or interests, instructor assessments, first party data from third parties. The idea expressed here is to curate experiences that are co-consumed but also mutually created or performed by the players undergoing the experience.

The server 1320 can operate as a matchmaker, finding players and spectators alike to participate in and to consume a jam session. As mentioned above, a jam session does not necessarily mean that all the players play a musical instrument. For example, it is contemplated that a jam session can include a reading of poetry or a play or a film/TV script or freestyle rap, with or without a musical score accompaniment, sound effects, etc., such that some or all participants (players) in the session contribute voice sound input via a microphone.

Group Jamming

An online platform allows users of client devices 1370*a,b,c,d* to host, find, and join jam sessions built on top of the ultra low-latency technology utilizing the controllers 1302. Information from each user is captured to intelligently help them locate relevant jam sessions, information such as: instrument or instruments played, the player's proficiency level on each instrument, what skills or concepts the player has worked on, are working on, or have yet to work on as identified based on songs or exercises completed in the Method Book, what Method Book level the player is on, bands or genres the player likes or enjoys, bands or genres the player have played or been assigned in the Method App. Additional information includes data from the player's SPOTIFY or other music service listening history, TICKETMASTER purchases, social media follows, and the like.

When a jam session is created and the players are looking for a musician (e.g., a drummer is needed), a push notification can be sent to drummer students that meet the criteria of who the players are looking for in the jam. For example, criteria can include any one or more of instrument, genre, proficiency level, geographic location (this is important to optimize for low latency), or player's age. All aspects herein incorporate the Method Engine database and algorithm to find relevant musicians to participate in a jam session and a song or songs to be played based on criteria or attributes described herein.

Any jam session can be broadcast to an audience to watch live. The audience can react to the performance in real-time by posting messages or through other interactivity such as virtual applause.

The server 1320 is configured to recommend songs based on information about the participants. This would utilize the multidimensional database disclosed herein to evaluate the participants based on one or more of the following criteria: ability level (self-selected or based on songs/exercises completed in the Method App, or Method Book level); songs the player has played, songs the player have not played but can play, songs that might be more challenging to the player, songs that might be easier for the player to play; instrumentation, e.g., songs appropriate for multiple guitar players, no keys players, etc.; concepts that have been learned or mastered (songs the player can probably play but may not be familiar with, for example); concepts that the player is still working on or has yet to master (looking for a new challenge, or to develop a skill that you haven't worked on before, for example); genre preferences (self-selected or based on songs/exercises completed in the Method App); tempo preferences (looking for a fast song, slow song, medium, etc.); era of song (50s, 60s, 70s, etc.); vocal range (for singers); key; mature themes, explicit lyrics; length of song; other elements (time signature, includes non-typical instruments, common chord progressions). The server 1320 can also recommend players for jam sessions using data from the multidimensional database using similar criteria as described above.

Part transcriptions can also be displayed to the participants (the multidimensional database of part transcriptions can include individual parts for some or all songs in the database). An automated feedback assessment algorithm, such as MATCHMYSOUND, can be utilized to evaluate individual participants relative to a part or transcription.

Any of the participants herein can also participate in a pedagogical lesson or in a jam session or the like in the Metaverse 1340, 304, 906. Each participant can also be represented by an avatar, for example, with the hand, arm, leg, or mouth gestures of the avatar being mimicked in real time according to the human musician's actual hand, arm, leg, or mouth gestures while playing the instrument (or singing a song or reading a poem). A drummer, for example, uses hands, arms, legs, and feet, and all of these body parts can be mimicked by the corresponding avatar counterpart in the Metaverse in real time as the drummer plays the drums in the real time. Likewise, the arm and hand movements of a violinist, guitarist, or pianist can be mimicked by a corresponding avatar in the Metaverse.

Numerous combinations and variations not specifically set forth herein will now be evident to the skilled artisan that are contemplated as within the scope of the invention claimed. Where considered reasonable and evident to the skilled artisan, elements of different variations described may be recombined to form additional embodiments where such come within the scope of the invention as claimed.

What is claimed is:

1. A system to facilitate a live jam session featuring live audio of a song produced by a plurality of human players and which is mixed in real time to produce a mixed audio output, the song being automatically recommended by a song recommendation engine, the system comprising:
   a first controller having a low-latency audio performance under 50 mS, the first controller being associated with a first user;
   a first audio interface comprising a first audio input to receive sound from a microphone or from a musical instrument played by a first of the human players associated with the first user;
   a second controller having a low-latency audio performance under 50 mS, the second controller being associated with a second user;
   a second audio interface comprising a second audio input to receive sound from a microphone or from a musical instrument played by a second of the human players associated with the second user; and
   a server communicatively coupled, via a computer network, to the first controller and to the second controller,
   wherein the server is configured to:
   retrieve an indication of a first musical instrument played by the first player;
   retrieve a first proficiency level of the first player on the first musical instrument;
   initiate a jam session in which the first controller is assigned to be a host of the jam session;
   retrieve an indication of a second musical instrument played by the second player;
   retrieve a second proficiency level of the second player on the second musical instrument;
   invite the second user or accept a request by the second user to join the live jam session; and
   recommend to the first user and the second user a song to be played during the jam session based on at least the respective musical instruments played by the first and second players and the respective proficiency levels of the first and second players,
   wherein, during the jam session;
   the first audio input and the second audio input are mixed in real time to produce a mixed output; and
   a representation of the mixed output is streamed via the computer network for playback on a computing device.

2. The system of claim 1, wherein the first controller operates as a headless system, and wherein an operating system running on the first controller is optimized for the low-latency audio performance.

3. The system of claim 1, wherein, the server is further configured to:
   stream the representation to a plurality of spectator user devices;
   mute or prohibit one or more of the plurality of spectator user devices from introducing any audio into the mixed output during performance of the live jam session; and
   during a selected time during the live jam session or following performance of a song of the live jam session:
   activate a respective microphone of each of the plurality of spectator user devices;
   mix, in real time into the representation, an audience audio representation comprising sounds inputted to the respective microphones of the spectator user devices.

4. The system of claim 3, wherein the audience audio representation comprises sound of humans operating the spectator user devices applauding or audibly cheering the performance.

5. The system of claim 1, wherein
   the server is configured to retrieve the indications of the first proficiency and the second proficiency from a database of a music education system; and
   the first proficiency and the second proficiency are determined, at least in part, by one or more instructor users of the music education system.

6. The system of claim 5, wherein one or more of the first proficiency and the second proficiency is determined, at least in part, by automated feedback on a completion of a musical technique assignment.

7. The system of claim 5, wherein the server is configured to provide, to a selected player in the jam, automated feedback based on a performance of a portion of a song played in the jam.

8. The system of claim 1, wherein the first controller operates as a headless system, and wherein an operating system running on the first controller is optimized for the low-latency audio performance.

9. The system of claim 1, wherein, the server is further configured to:
   stream the representation to a plurality of spectator user devices;
   mute or prohibit one or more of the plurality of spectator user devices from introducing any audio into the mixed output during performance of the live jam session; and
   during a selected time during the live jam session or following performance of a song of the live jam session:
   activate a respective microphone of each of the plurality of spectator user devices;
   mix, in real time into the representation, an audience audio representation comprising sounds inputted to the respective microphones of the spectator user devices.

10. The system of claim 3, wherein the audience audio representation comprises sound of humans operating the spectator user devices applauding or audibly cheering the performance.

11. The system of claim 1, wherein
    the server is configured to retrieve the indications of the first proficiency and the second proficiency from a database of a music education system; and
    the first proficiency and the second proficiency are determined, at least in part, by one or more instructor users of the music education system.

12. The system of claim 11, wherein one or more of the first proficiency and the second proficiency is determined, at least in part, by automated feedback on a completion of a musical technique assignment.

13. A system to facilitate a live jam session featuring live audio of a song produced by a plurality of human players and which is mixed in real time to produce a mixed audio output, the song being automatically recommended by a song recommendation engine, the system comprising a server configured to:
    communicatively couple, via a computer network, to a first controller and a second controller, each controller having a low-latency audio performance under 50 mS, each controller comprising a user audio interface comprising an receive sound from a microphone or from a musical instrument played by a human player, wherein the first controller being associated with a first user and the second controller is associated with a second user;

retrieve an indication of a first musical instrument played by the first player;

retrieve a first proficiency level of the first player on the first musical instrument;

initiate a jam session in which the first controller is assigned to be a host of the jam session;

retrieve an indication of a second musical instrument played by the second player;

retrieve a second proficiency level of the second player on the second musical instrument;

invite the second user or accept a request by the second user to join the live jam session; and recommend to the first user and the second user a song to be played during the jam session based on at least the respective musical instruments played by the first and second players and the respective proficiency levels of the first and second players, wherein, during the jam session:

audio signals from the audio inputs of the controllers are mixed in real time to produce a mixed output; and a representation of the mixed output is streamed via the computer network for playback on a computing device.

14. The system of claim 11, wherein the server is configured to provide, to a selected player in the jam, automated feedback based on a performance of a portion of a song played in the jam.

15. A method performed by a computer server, the method comprising:

communicatively coupling, via a server on a computer network, a first controller and a second controller, each controller having a low-latency audio performance under 50 mS, each controller comprising a user audio interface comprising an receive sound from a microphone or from a musical instrument played by a human player, wherein the first controller being associated with a first user and the second controller is associated with a second user;

retrieving an indication of a first musical instrument played by the first player;

retrieve a first proficiency level of the first player on the first musical instrument;

initiate a jam session in which the first controller is assigned to be a host of the jam session;

retrieve an indication of a second musical instrument played by the second player;

retrieve a second proficiency level of the second player on the second musical instrument;

invite the second user or accept a request by the second user to join the live jam session; and recommend to the first user and the second user a song to be played during the jam session based on at least the respective musical instruments played by the first and second players and the respective proficiency levels of the first and second players, wherein, during the jam session:

audio signals from the audio inputs of the controllers are mixed in real time to produce a mixed output; and a representation of the mixed output is streamed via the computer network for playback on a computing device.

16. The method of claim 15, further comprising:

streaming the representation to a plurality of spectator user devices;

muting or prohibiting one or more of the plurality of spectator user devices from introducing any audio into the mixed output during performance of the live jam session; and during a selected time during the live jam session or following performance of a song of the live jam session:

activating a respective microphone of each of the plurality of spectator user devices;

mixing, in real time into the representation, an audience audio representation comprising sounds inputted to the respective microphones of the spectator user devices.

17. The method of claim 16, wherein the audience audio representation comprises sound of humans operating the spectator user devices applauding or audibly cheering the performance.

18. The method of claim 15, further comprising retrieving the indications of the first proficiency and the second proficiency from a database of a music education system, wherein the first proficiency and the second proficiency are determined, at least in part, by one or more instructor users of the music education system.

19. The method of claim 18, wherein one or more of the first proficiency and the second proficiency is determined, at least in part, by automated feedback on a completion of a musical technique assignment.

20. The method of claim 18, further comprising providing, to a selected player in the jam, automated feedback based on a performance of a portion of a song played in the jam.

* * * * *